United States Patent
Hu et al.

(10) Patent No.: US 9,867,099 B2
(45) Date of Patent: Jan. 9, 2018

(54) CELL ACCESS METHOD, APPARATUS, AND SYSTEM

(71) Applicant: Huawei Technologies Co., Ltd., Shenzhen (CN)

(72) Inventors: Zhenxing Hu, Shenzhen (CN); Wei Quan, Beijing (CN); Xiaodong Yang, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 15/004,685

(22) Filed: Jan. 22, 2016

(65) Prior Publication Data
US 2016/0142957 A1 May 19, 2016

Related U.S. Application Data

(63) Continuation of application No. PCT/CN2014/071822, filed on Jan. 29, 2014.

(30) Foreign Application Priority Data

Jul. 24, 2013 (WO) ................ PCT/CN2013/080034

(51) Int. Cl.
*H04W 36/16* (2009.01)
*H04W 36/00* (2009.01)
(Continued)

(52) U.S. Cl.
CPC ..... *H04W 36/165* (2013.01); *H04W 36/0094* (2013.01); *H04W 36/08* (2013.01);
(Continued)

(58) Field of Classification Search
None
See application file for complete search history.

(56) References Cited

U.S. PATENT DOCUMENTS 8,340,664 B2 12/2012 Tenny et al.
2013/0183982 A1* 7/2013 Martin ............ H04W 36/0061
455/437
(Continued)

FOREIGN PATENT DOCUMENTS

CN 102238751 A 11/2011
CN 102685838 A 9/2012
(Continued)

OTHER PUBLICATIONS

Nokia Siemens Networks, Nokia Corporation, Discussion on RACH access Failure [online], 3GPP TSG-RAN WG2#81bis R2-131434 (Apr. 15-19, 2013).
(Continued)

*Primary Examiner* — Diane Lo
(74) *Attorney, Agent, or Firm* — Leydig, Voit & Mayer, Ltd.

(57) ABSTRACT

Embodiments of the present disclosure provide a cell access method, an apparatus, and a system, where the method includes: when user equipment camps on a first cell, receiving, by the user equipment, a first signal offset of the first cell and a random access failure threshold of the first cell; attempting, by the user equipment, to perform random access to the first cell, and counting a quantity of random access failures; and if the quantity of random access failures reaches the random access failure threshold, performing cell reselection, by the user equipment, by using the first signal offset for the first cell; and if no cell meets a service condition in cell reselection, performing cell reselection, by the user equipment, without using the first signal offset. Therefore, a service interruption problem of user equipment when random access to a cell fails in the prior art can be resolved.

25 Claims, 17 Drawing Sheets

(51) Int. Cl.
H04W 36/08 (2009.01)
H04W 48/20 (2009.01)
H04W 74/08 (2009.01)
H04W 48/16 (2009.01)

(52) U.S. Cl.
CPC ........... *H04W 48/20* (2013.01); *H04W 74/08* (2013.01); *H04W 48/16* (2013.01)

(56) References Cited

U.S. PATENT DOCUMENTS

| 2014/0057631 A1 | 2/2014 | Zhang et al. | |
| 2014/0295851 A1* | 10/2014 | Kubota | H04W 36/0083 455/441 |
| 2016/0057688 A1* | 2/2016 | Koskinen | H04W 48/16 370/332 |

FOREIGN PATENT DOCUMENTS

| JP | 2010536253 A | 11/2010 |
| WO | 2014180714 A1 | 11/2014 |

OTHER PUBLICATIONS

NTT Docomo, Inc., RACH transmission Failure issue [online], 3GPP TSG-RAN WG2#81bis R2-131266 (Apr. 15-19, 2013).
Huawei, HiSilicon, CHIBA issue [online], 3GPP TSG-RAN WG2#85 R2-140305 (Feb. 10-14, 2014).
"Our view on the 'Chiba issue'—RACH access failure," 3GPP TSG RAN WG2 #82, Fukuoka, Japan, R2-131654, 3$^{rd}$ Generation Partnership Project, Valbonne, France (May 20-24, 2013).
"RACH transmission failure issue," 3GPP TSG-RAN WG2 Meeting #82, Fukuoka, Japan, R2-131892, 3$^{rd}$ Generation Partnership Project, Valbonne, France (May 20-24, 2013).
"Correction to PRACH transmission failure handling," 3GPP TSG-RAN WG 2 Meeting #84, San Francisco, California, Change Request, R2-133814, 3$^{rd}$ Generation Partnership Project, Valbonne, France (Nov. 11-15, 2013).
"RACH transmission Failure issue," 3GPP TSG-RAN WG2 Meeting #81, St. Julian's, Malta, R2-130436, 3$^{rd}$ Generation Partnership Project, Valbonne, France (Jan. 28-Feb. 1, 2013).
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.6.0, pp. 1-209, 3$^{rd}$ Generation Partnership Project, Valbonne, France (Jun. 2013).
"3$^{rd}$ Generation Partnership Project; Technical Specification Group Radio Access Network; Evolved Universal Terrestrial Radio Access (E-UTRA); User Equipment (UE) procedures in idle mode (Release 11)," 3GPP TS 36.304, V11.4.0, pp. 1-34, 3$^{rd}$ Generation Partnership Project, Valbonne, France (Jun. 2013).
"3$^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.4.0, pp. 1-346, 3$^{rd}$ Generation Partnership Project, Valbonne, France (Jun. 2013).

* cited by examiner

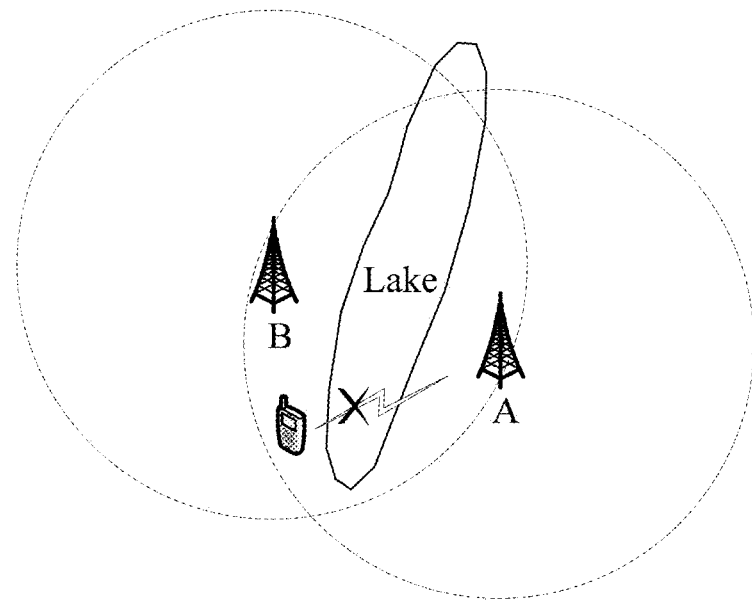

FIG. 1

```
Receive a signal quality threshold, which is sent
  by a base station, for Chiba cell reselection,
  where a base station to which the Chiba cell
  belongs can provide a downlink signal of a          201
    normal communications service for user
  equipment, and cannot normally receive an
 uplink signal that is sent by the user equipment
             during random access
```

```
  Perform determining according to a result of
  comparison between measured signal quality
 and the signal quality threshold, and if the result   202
 meets a preset reselection condition, reselect the
        Chiba cell from a non-Chiba cell
```

FIG. 2

Receive at least one reselection time limit value that is sent by a base station and corresponds to a moving speed of user equipment or a type of user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot receive an uplink signal that is sent by the user equipment during random access — 801

Select the reselection time limit value according to the moving speed or the user equipment type of the user equipment, and forbid, within a time of the reselection time limit value, reselection to the Chiba cell — 802

FIG. 8

Send, to user equipment, at least one reselection time limit value corresponding to a moving speed of the user equipment or a type of the user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot receive an uplink signal that is sent by the user equipment during random access — 901

Communicate with the user equipment, so that the user equipment performs cell reselection between the Chiba cell and a non-Chiba cell according to the reselection time limit value — 902

FIG. 9

CELL ACCESS METHOD, APPARATUS, AND SYSTEM

CROSS-REFERENCE TO RELATED APPLICATIONS

This application is a continuation of International Patent Application No. PCT/CN2014/071822, filed on Jan. 29, 2014, which claims priority to International Patent Application No. PCT/CN2013/080034, filed on Jul. 24, 2013, both of which are hereby incorporated by reference in their entireties.

TECHNICAL FIELD

The present disclosure relate to wireless communications technologies, and in particular, to a cell access method, an apparatus, and a system.

BACKGROUND

In a wireless communications system, after being powered on, user equipment (UE) selects a suitable cell to camp on, then establishes a connection to a base station of the cell by performing a random access process, and performs a registration process, a location update process, and other processes.

After camping on a cell, the UE selects, according to changes of a location after movement, a base station of a cell, and a service and the like, a better serving cell to camp on by means of cell reselection, for example, a serving cell having better signal quality or a higher priority.

In practical application, due to a geographical environment, weather, or the like, it occurs that a base station located far from a UE can provide, a better downlink signal than a base station located near the UE, but cannot normally receive an uplink signal that is sent by the user equipment during random access, which causes that when selecting a cell to camp on, the UE selects a cell in which the base station located far from the UE is located, and the random access performed by the UE fails, leading to interruption of a service provided to the UE. Because this special situation occurs in the Chiba region in Japan, such a cell is referred to as a Chiba (CHIBA) cell. FIG. 1 is a schematic diagram of a Chiba cell in the prior art. As shown in FIG. 1, due to a reflection action of the surface of a lake, a UE receives a downlink signal of a cell A on the right of the lake better than a downlink signal of a cell B on the left of the lake, and therefore the UE selects the cell A to camp on. However, because the UE is located far from the cell A, a failure occurs when the UE initiates random access; and even though the UE successfully performs random access to the cell B, the UE still reselects the cell A due to a better downlink signal of the cell A, causing service interruption.

SUMMARY

Embodiments of the present disclosure provide a cell access method, an apparatus, and a system, so as to resolve a problem of service interruption of user equipment when access to a cell fails.

According to a first aspect, an embodiment of the present disclosure provides a cell access method, where the method includes:

when user equipment camps on a first cell, receiving, by the user equipment, a first signal offset of the first cell and a random access failure threshold of the first cell that are sent by a first base station, where the first base station is a base station to which the first cell belongs;

attempting, by the user equipment, to perform random access to the first cell, and counting a quantity of random access failures; and if the quantity of random access failures reaches the random access failure threshold, starting, by the user equipment, a cell reselection adjustment, where the cell reselection adjustment includes: adjusting a signal measurement value of the first cell by using the first signal offset.

According to the first aspect, in a first possible implementation manner of the first aspect, the method further includes:

when the user equipment camps on the first cell, receiving, by the user equipment, a second signal offset of a second cell sent by the first base station, where the second cell is a neighboring cell of the first cell, where the cell reselection adjustment further includes: adjusting a signal measurement value of the second cell by using the second signal offset.

According to the first aspect or the first possible implementation manner of the first aspect, in a second possible implementation manner of the first aspect, after the user equipment performs cell reselection, the user equipment selects the second cell to camp on, where the second cell is a neighboring cell of the first cell; and the cell reselection adjustment further includes: when the user equipment camps on the second cell and performs cell reselection, adjusting the signal measurement value of the first cell by using the first signal offset.

According to the first aspect or the first possible implementation manner of the first aspect, in a third possible implementation manner of the first aspect, when the user equipment camps on the first cell, the user equipment further receives a third signal offset of the first cell sent by the first base station;

after the user equipment performs cell reselection, the user equipment selects the second cell to camp on, where the second cell is a neighboring cell of the first cell; and the cell reselection adjustment further includes: when the user equipment camps on the second cell and performs cell reselection, adjusting the signal measurement value of the first cell by using the third signal offset of the first cell.

According to the first aspect or the first possible implementation manner of the first aspect, in a fourth possible implementation manner of the first aspect, after the user equipment performs cell reselection, the user equipment selects the second cell to camp on, where the second cell is a neighboring cell of the first cell;

the user equipment receives a fourth signal offset of the first cell sent by a second base station, where the second base station is a base station to which the second cell belongs; and the cell reselection adjustment further includes: when the user equipment camps on the second cell and performs cell reselection, adjusting the signal measurement value of the first cell by using the fourth signal offset.

According to the first aspect and any one of the first to the fourth possible implementation manners of the first aspect, in a fifth possible implementation manner of the first aspect, after the user equipment performs cell reselection, the user equipment selects the second cell to camp on, where the second cell is a neighboring cell of the first cell;

the user equipment receives a fifth signal offset of the second cell sent by the second base station, where the second base station is a base station to which the second cell belongs; and the cell reselection adjustment further includes: when the user equipment camps on the second cell and performs cell reselection, adjusting the signal measurement value of the second cell by using the fifth signal offset.

According to the first aspect and any one of the first to the fifth possible implementation manners of the first aspect, in a sixth possible implementation manner of the first aspect, after the starting, by the user equipment, a cell reselection adjustment, the method further includes:

counting, by the user equipment, a quantity of changes of a camping cell, where the quantity of changes of a camping cell indicates quantities of changes of a current camping cell and a previous camping cell after the user equipment performs cell reselection; and if the quantity of changes of a camping cell reaches a camping cell change quantity threshold, stopping, by the user equipment, the cell reselection adjustment; or if the user equipment finds, in a current camping cell and a neighboring cell of the current camping cell, no cell meeting a service condition, stopping, by the user equipment, the cell reselection adjustment.

According to the first aspect and any one of the first to the sixth possible implementation manners of the first aspect, in a seventh possible implementation manner of the first aspect, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

According to a second aspect, an embodiment of the present disclosure provides a cell access method, where the method includes:

sending, by a first base station, a first signal offset of a first cell and a random access failure threshold of the first cell to user equipment, where the user equipment camps on the first cell, and the first base station is a base station to which the first cell belongs, where the first signal offset is used for starting a cell reselection adjustment when a quantity of random access failures of the user equipment reaches the random access failure threshold, and the cell reselection adjustment includes: adjusting, by the user equipment, a signal measurement value of the first cell by using the first signal offset.

According to the second aspect, in a first possible implementation manner of the second aspect, the method further includes:

sending, by the first base station, a second signal offset of a second cell to the user equipment, where the second cell is a neighboring cell of the first cell, where the second signal offset is used for: when the user equipment starts the cell reselection adjustment, further adjusting a signal measurement value of the second cell by using the second signal offset.

According to the second aspect or the first possible implementation manner of the second aspect, in a second possible implementation manner of the second aspect, the method further includes: sending, by the first base station, a third signal offset of the first cell to the user equipment, where the third signal offset is used for: when the user equipment starts the cell reselection adjustment and camps on the second cell, further adjusting the signal measurement value of the first cell by using the third signal offset of the first cell, where the second cell is a neighboring cell of the first cell.

According to the second aspect and either one of the first to the second possible implementation manners of the second aspect, in a third possible implementation manner of the second aspect, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

According to a third aspect, an embodiment of the present disclosure provides user equipment, where the user equipment includes:

a receiving module, configured to: when the user equipment camps on a first cell, receive a first signal offset of the first cell and a random access failure threshold of the first cell that are sent by a first base station, and transmit the first signal offset and the random access failure threshold to an adjustment start module, where the first base station is a base station to which the first cell belongs;

a random access module, configured to attempt to perform random access to the first cell, count a quantity of random access failures, and transmit the quantity of random access failures to the adjustment start module; and the adjustment start module, configured to receive the quantity of random access failures from the random access module, and if the quantity of random access failures reaches the random access failure threshold, start a cell reselection adjustment, where the cell reselection adjustment includes: adjusting a signal measurement value of the first cell by using the first signal offset.

According to the third aspect, in a first possible implementation manner of the third aspect, the receiving module is further configured to: when the user equipment camps on the first cell, receive a second signal offset of a second cell sent by the first base station, where the second cell is a neighboring cell of the first cell; and the cell reselection adjustment further includes: adjusting a signal measurement value of the second cell by using the second signal offset.

According to the third aspect or the first possible implementation manner of the third aspect, in a second possible implementation manner of the third aspect, the user equipment further includes:

a camping module, configured to: after the user equipment performs cell reselection, select the second cell to camp on, where the second cell is a neighboring cell of the first cell, where the cell reselection adjustment further includes: when the user equipment camps on the second cell and performs cell reselection, adjusting the signal measurement value of the first cell by using the first signal offset.

According to the third aspect or the first possible implementation manner of the third aspect, in a third possible implementation manner of the third aspect, the receiving module is further configured to: when the user equipment camps on the first cell, further receive a third signal offset of the first cell sent by the first base station; and the user equipment further includes:

a camping module, configured to: after the user equipment performs cell reselection, select the second cell to camp on, where the second cell is a neighboring cell of the first cell, where the cell reselection adjustment further includes: when the user equipment camps on the second cell and performs cell reselection, adjusting the signal measurement value of the first cell by using the third signal offset of the first cell.

According to the third aspect or the first possible implementation manner of the third aspect, in a fourth possible implementation manner of the third aspect, the user equipment further includes:

a camping module, configured to: after the user equipment performs cell reselection, select the second cell to camp on, where the second cell is a neighboring cell of the first cell, where the receiving module is further configured to receive a fourth signal offset of the first cell sent by a second base station, where the second base station is a base station to which the second cell belongs; and the cell reselection adjustment further includes: when the user equipment camps on the second cell and performs cell reselection, adjusting the signal measurement value of the first cell by using the fourth signal offset.

According to the third aspect and any one of the first to the fourth possible implementation manners of the third aspect, in a fifth possible implementation manner of the third aspect, the camping module is configured to: after the user equipment performs cell reselection, select the second cell to camp on, where the second cell is a neighboring cell of the first cell;

the receiving module is further configured to receive a fifth signal offset of the second cell sent by the second base station, where the second base station is a base station to which the second cell belongs; and the cell reselection adjustment further includes: when the user equipment camps on the second cell and performs cell reselection, adjusting the signal measurement value of the second cell by using the fifth signal offset.

According to the third aspect and any one of the first to the fifth possible implementation manners of the third aspect, in a sixth possible implementation manner of the third aspect, the user equipment further includes:

an adjustment stop module, configured to: after the user equipment starts the cell reselection adjustment, count a quantity of changes of a camping cell, where the quantity of changes of a camping cell indicates quantities of changes of a current camping cell and a previous camping cell after the user equipment performs cell reselection; and if the quantity of changes of a camping cell reaches a camping cell change quantity threshold, stop the cell reselection adjustment; or the adjustment stop module, configured to: if no cell meeting a service condition is found in a current camping cell or a neighboring cell of the current camping cell, stop the cell reselection adjustment.

According to the third aspect and any one of the first to the sixth possible implementation manners of the third aspect, in a seventh possible implementation manner of the third aspect, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

According to a fourth aspect, an embodiment of the present disclosure provides a base station, where the base station includes:

a sending module, configured to: when user equipment camps on a first cell, send a first signal offset of the first cell and a random access failure threshold of the first cell to the user equipment, where the base station is a base station to which the first cell belongs, where the first signal offset is used for starting a cell reselection adjustment when a quantity of random access failures of the user equipment reaches the random access failure threshold, and the cell reselection adjustment includes: adjusting, by the user equipment, a signal measurement value of the first cell by using the first signal offset.

According to the fourth aspect, in a first possible implementation manner of the fourth aspect, the sending module is further configured to: when the user equipment camps on the first cell, send a second signal offset of a second cell to the user equipment, where the second cell is a neighboring cell of the first cell; and the second signal offset is used for: when the user equipment starts the cell reselection adjustment, further adjusting a signal measurement value of the second cell by using the second signal offset.

According to the fourth aspect or the first possible implementation manner of the fourth aspect, in a second possible implementation manner of the fourth aspect, the sending module is further configured to: when the user equipment camps on the first cell, send a third signal offset of the first cell to the user equipment, where the third signal offset is used for: when the user equipment starts the cell reselection adjustment and camps on the second cell, further adjusting the signal measurement value of the first cell by using the third signal offset of the first cell, where the second cell is a neighboring cell of the first cell.

According to the fourth aspect and either one of the first to the second possible implementation manners of the fourth aspect, in a third possible implementation manner of the fourth aspect, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

According to a fifth aspect, an embodiment of the present disclosure provides a cell access system, where the cell access system includes: any user equipment provided in the third aspect; or any base station provided in the fourth aspect.

By means of the cell access method, the apparatus, and the system that are provided in the embodiments of the present disclosure, after random access to a camping cell fails, user equipment can automatically determine, according to a quantity of random access failures and a random access failure threshold, whether to start a cell reselection adjustment. When the cell reselection adjustment is started, a signal measurement value of the current camping cell can be adjusted according to a first signal offset, and cell selection or cell reselection can be performed according to an adjusted value of the signal measurement value of the first cell. This helps reselect another cell except the current camping cell, avoids service interruption, and improves user experience.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

FIG. 1 is a schematic diagram of a Chiba cell in the prior art;

FIG. 2 is a flowchart of Embodiment 1 of a cell reselection method according to the present disclosure;

FIG. 8 is a flowchart of Embodiment 7 of a cell reselection method according to the present disclosure;

FIG. 9 is a flowchart of Embodiment 8 of a cell reselection method according to the present disclosure;

DESCRIPTION OF EMBODIMENTS

Figure 3:
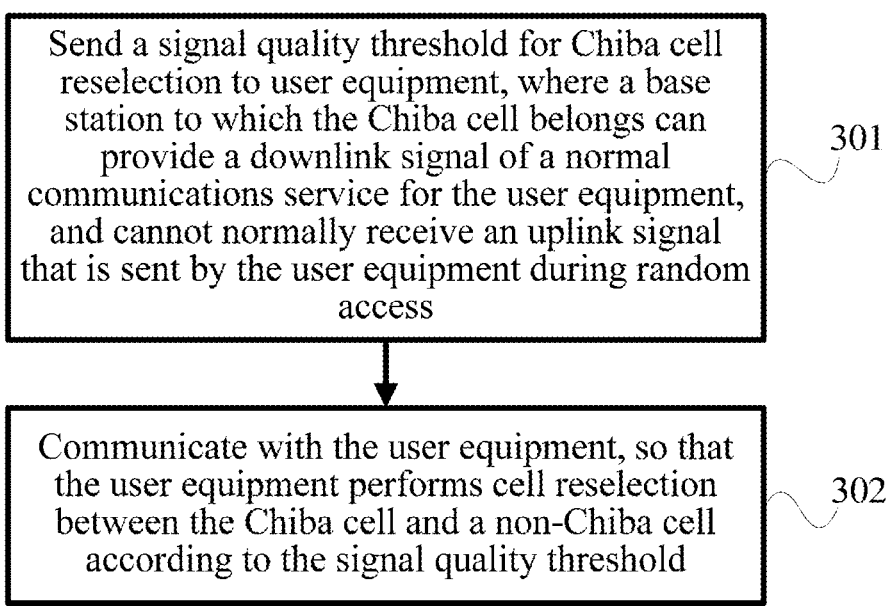
FIG. 3 is a flowchart of Embodiment 2 of a cell reselection method according to the present disclosure.

To make the objectives, technical solutions, and advantages of the embodiments of the present disclosure clearer, the following clearly describes the technical solutions in the embodiments of the present disclosure in detail with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions provided by the embodiments of the present disclosure may be applied to various wireless communications networks, such as: a Global System for Mobile Communications (GSM) system, a Code Division Multiple Access (CDMA) system, a Wideband Code Division Multiple Access (WCDMA) system, a Universal Mobile Telecommunications System (UMTS) system, a general packet radio service (GPRS) system, a Long Term Evolution (LTE) system, a Long Term Evolution Advanced (LTE-A) system, and a Worldwide Interoperability for Microwave Access (WiMAX) system. The terms "network" and "system" may be interchanged.

In the embodiments of the present disclosure, a base station (BS) may be a device communicating with user equipment (UE) or another communication site such as a repeater site, and the base station may provide communication coverage of a specific physical region. For example, the base station may specifically be a base transceiver station (BTS) or a base station controller (BSC) in GSM or CDMA, or may be a node B (NB) in UMTS or a radio network controller (RNC) in UMTS, or may be an evolved base station (Evolutional Node B, eNB or eNodeB) in LTE, or may be another access network device providing an access service in a wireless communications network, which is not limited in the present disclosure.

In the embodiments of the present disclosure, UEs may be distributed in an entire wireless network, and each UE may be static or mobile. The UE may be referred to as a terminal, a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL), or the like.

Embodiment 1

FIG. 2 is a flowchart of Embodiment 1 of a cell reselection method according to the present disclosure. The method in this embodiment is applicable to a situation in which a Chiba cell exists in a wireless communications system, and the wireless communications system includes a base station and user equipment. The method is executed by a cell reselection apparatus, and the apparatus can be implemented in a form of hardware or software, and may be configured on the user equipment in the wireless communications system, for example, a smart phone or a tablet computer. As shown in FIG. 2, the method specifically includes the following steps:

Step 201: Receive a signal quality threshold, which is sent by the base station, for Chiba cell reselection, where a base station to which a Chiba cell belongs can provide a downlink signal of a normal communications service for the user equipment, and cannot normally receive an uplink signal that is sent by the user equipment during random access.

In this step, the Chiba cell is a special cell discovered by a Japanese operator in Chiba (CHIBA), and by reason of a geographical environment, weather, or the like, this cell can provide a good downlink signal used for a communications service to the user equipment, but cannot receive an uplink signal that is sent by the user equipment during random access, while a non-Chiba cell indicates a cell that does not have the foregoing feature. It should be noted that, although a cell having such a feature is defined as a Chiba cell in the present disclosure, it indicates that a cell that is named another name or expressed in another manner and has such a feature also belongs to the protection scope of this application.

Specifically, the signal quality threshold for Chiba cell reselection includes any one or more of the following: a Chiba cell reselection upper limit value, a non-Chiba cell reselection lower limit value, a Chiba cell reselection offset, and a non-Chiba cell reselection offset. For example, the Chiba cell reselection upper limit value is defined as Threshold A, the non-Chiba cell reselection lower limit value is defined as Threshold B, the Chiba cell reselection offset is defined as Offset A, and the non-Chiba cell reselection offset is defined as Offset B.

Step 202: Perform determining according to a result of comparison between measured signal quality and the signal quality threshold, and if the result meets a preset reselection condition, reselect the Chiba cell from a non-Chiba cell.

The preset reselection condition not only includes the result of comparison between the measured signal quality and the signal quality threshold, but also includes another user equipment cell reselection condition that needs to be met, for example, a time when the UE camps on a current serving cell needs to exceed 1 second.

In this embodiment of the present disclosure, the signal quality threshold sent by the base station is received, and the signal quality threshold is compared with the measured signal quality when cell reselection is to be performed, so as to implement cell reselection of the user equipment, which resolves a problem in the prior art that service interruption is caused by blindly selecting the Chiba cell by the user equipment.

Further, based on this embodiment, the performing determining according to a result of comparison between measured signal quality and the signal quality threshold, and if the result meets a preset reselection condition, reselecting the Chiba cell from a non-Chiba cell includes:

if detected signal quality of the Chiba cell is higher than the Chiba cell reselection upper limit value or/and detected signal quality of the non-Chiba cell is lower than the non-Chiba cell reselection lower limit value, performing cell reselection to the Chiba cell; or if detected signal quality of the Chiba cell is higher than a sum of a preset reselection threshold and the Chiba cell reselection offset or/and detected signal quality of the non-Chiba cell is lower than a difference between the preset reselection threshold and the non-Chiba cell reselection offset, performing cell reselection to the Chiba cell.

Description is specifically made below by using Threshold A, Threshold B, Offset A, and Offset B as an example. Assuming that the preset reselection threshold is Threshold C, the signal quality, which is measured by the user equipment, of the Chiba cell is S1, and the signal quality, which is measured by the user equipment, of the non-Chiba cell is S2, there are at least the following multiple possibilities causing the user equipment to select the Chiba cell during reselection:

S1>Threshold A;
S2<Threshold B;
(S1>Threshold A)&&(52<Threshold B);
(S1>Threshold A)||(S2<Threshold B);
(S1−Threshold C)>Offset A;
(Threshold C−S2)<Offset B;
((S1−Threshold C)>Offset A)&&((Threshold C−S2)<Offset B); and
((S1−Threshold C)>Offset A)||((Threshold C−S2)<Offset B).

It should be noted that, the foregoing listed formulas are not all determining formulas used in the present disclosure, and determining formulas based on the signal quality threshold and the measured signal quality all fall within the protection scope of the present disclosure.

According to the foregoing technical solution, user equipment can accurately select a corresponding cell as a reselected cell according to a specific determining formula and another necessary condition of user equipment cell reselection that needs to be met.

Embodiment 2

FIG. 3 is a flowchart of Embodiment 2 of a cell reselection method according to the present disclosure. The method in this embodiment is applicable to a situation in which a Chiba cell exists in a wireless communications system, and the wireless communications system generally includes a base station and user equipment. The method is executed by a cell reselection apparatus, and the apparatus can be implemented in a form of hardware or software, and may be configured on the base station, for example, in an eNB of LTE in the wireless communications system. As shown in FIG. 3, the method includes the following steps:

Step 301: Send a signal quality threshold for Chiba cell reselection to the user equipment, where a base station to which the Chiba cell belongs can provide a downlink signal of a normal communications service for the user equipment, and cannot normally receive an uplink signal that is sent by the user equipment during random access.

In this step, the Chiba cell described includes the Chiba cell described in any one of the foregoing embodiments, and is not described herein again.

Further, the signal quality threshold includes any one or more of the following: a Chiba cell reselection upper limit value, a non-Chiba cell reselection lower limit value, a Chiba cell reselection offset, and a non-Chiba cell reselection offset. For example, as described in the foregoing embodiment, the Chiba cell reselection upper limit value is defined as Threshold A, the non-Chiba cell reselection lower limit value is defined as Threshold B, the Chiba cell reselection offset is defined as Offset A, and the non-Chiba cell reselection offset is defined as Offset B. During specific implementation, the signal quality threshold may be directly manually configured by a network management system or automatically generated on a base station, and the signal quality threshold is recorded and stored in a local storage device of the base station. Various signal quality thresholds may be generated by the base station to which the Chiba cell belongs, may be generated by a base station to which a non-Chiba cell belongs, or may be provided by an upper-layer control network element, so as to perform, based on a feature of the Chiba cell, intervention and control on cell reselection between the Chiba cell and the non-Chiba cell.

Step 302: Communicate with the user equipment, so that the user equipment performs cell reselection between the Chiba cell and a non-Chiba cell according to the signal quality threshold.

If the user equipment compares the signal quality threshold with measured signal quality, and determines that reselection may be performed from the non-Chiba cell to the Chiba cell, the user equipment sends a cell reselection signal to the Chiba cell, for example, sends a random access preamble signal. In this case, a Chiba base station to which the Chiba cell belongs receives the preamble signal, and starts a random access process between the Chiba base station and the user equipment, or the user equipment directly camps on the Chiba cell by acquiring a broadcast message sent by the base station to which the Chiba cell belongs, so as to wait the base station to which the Chiba cell belongs to send a broadcast call signal.

As compared with the prior art in which service interruption is caused by blindly selecting a Chiba cell by user equipment during cell reselection, and a ping-pong problem is caused by repeatedly performing reselection between the Chiba cell and a non-Chiba cell, in this embodiment of the present disclosure, a base station sets a signal quality threshold, so that whether the Chiba cell is selected as a reselected cell is determined according to the signal quality threshold and measured signal quality when the UE performs cell reselection, and the problem that service interruption is caused by blindly selecting the Chiba cell by the UE during cell reselection is resolved.

Embodiment 3

Figure 4:
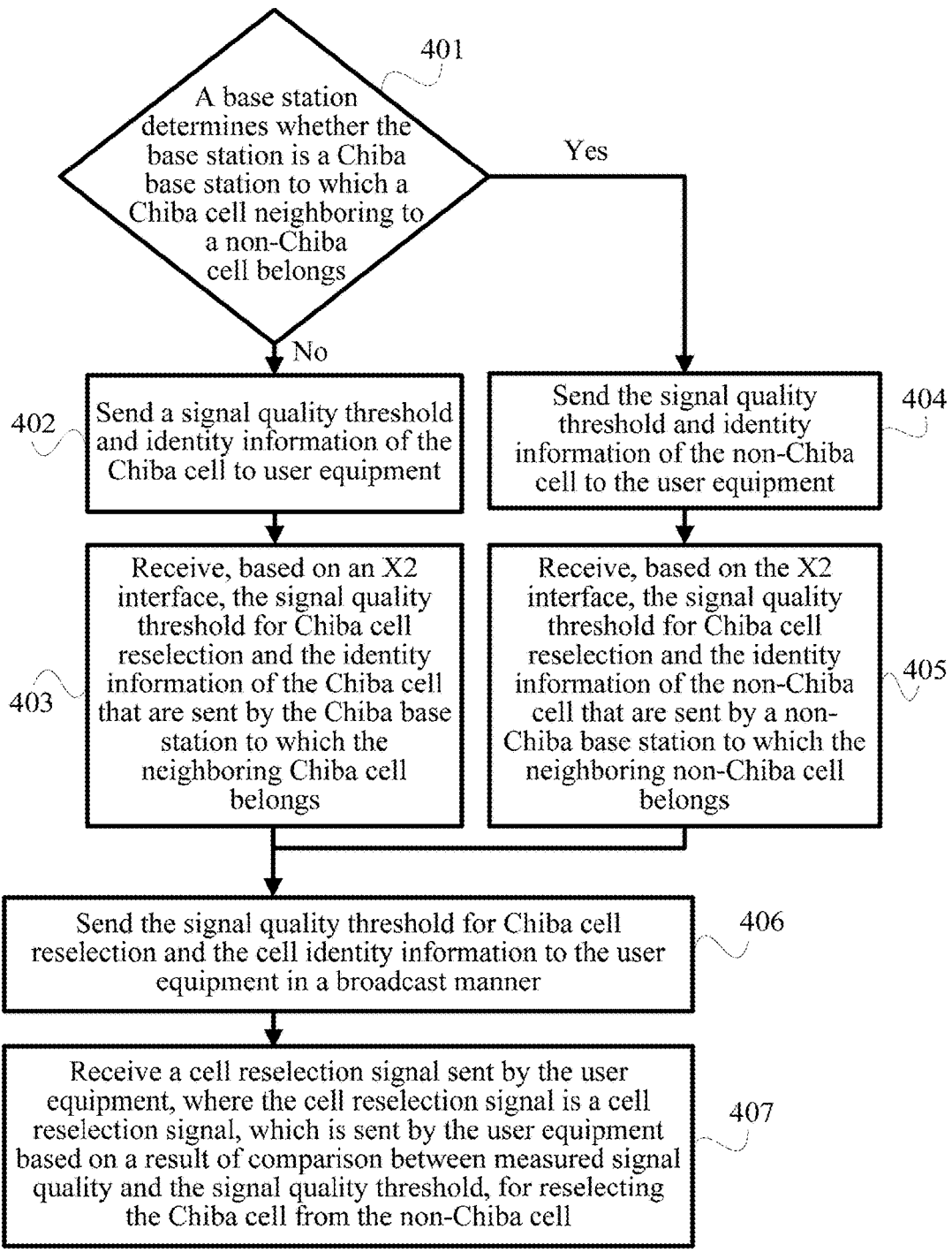
FIG. 4 is a flowchart of Embodiment 3 of a cell reselection method according to the present disclosure.

FIG. 4 is a flowchart of Embodiment 3 of a cell reselection method according to the present disclosure. Based on Embodiment 2, it is added to this embodiment that a cell identity is sent to user equipment. As shown in FIG. 4, the method includes the following steps:

Step 401: A base station determines whether the base station is a Chiba base station to which a Chiba cell neighboring to a non-Chiba cell belongs.

If the base station is not the Chiba base station to which the Chiba cell neighboring to the non-Chiba cell belongs, the base station is a non-Chiba base station, and step 402 is performed; if the base station is the Chiba base station to which the Chiba cell neighboring to the non-Chiba cell belongs, step 404 is performed.

In this embodiment, descriptions of the Chiba cell and the non-Chiba cell are consistent with those in the previous embodiment, and the Chiba cell and the non-Chiba cell are not described herein again.

In this step, whether the base station is the Chiba base station may be determined by using two methods: One is that the user equipment collects information about a failure of access initiated to the base station, and sends the failure information to a non-Chiba base station, and the non-Chiba base station collects and analyzes access failure information sent by multiple user equipments, learns that the base station is the Chiba base station, and notifies the base station that the base station is the Chiba base station. The other is that when network configuration is performed, it may be indicated on the base station that the base station is the Chiba base station in a drive test manner. A Chiba cell formed by reason of a specific environment may lose a feature of a Chiba cell because an external factor changes, that is, a cell in which a base station is located is not unchangeable as a Chiba cell or a non-Chiba cell, but changes as the external factor changes. The base station may identify according to a change feature of a cell signal whether the base station is a base station to which a Chiba cell belongs.

Step 402: Send a signal quality threshold and identity information of the Chiba cell to user equipment.

In this step, an identity of the Chiba cell is sent to the user equipment, so that when the user equipment receives the signal quality threshold, and compares the signal quality threshold with a measured signal, to determine whether to reselect the Chiba cell, the user equipment may identify, according to the identity of the Chiba cell, which cell is a reselected Chiba cell.

Step 403: Receive, based on an X2 interface, the signal quality threshold for Chiba cell reselection and the identity information of the Chiba cell that are sent by the Chiba base station to which the neighboring Chiba cell belongs.

The Chiba base station to which the neighboring Chiba cell belongs and the non-Chiba base station to which the non-Chiba cell belongs can synchronize information about the signal quality threshold by using the standard X2 interface, so that all non-Chiba base stations can broadcast the signal quality threshold generated by the Chiba base station to the UE.

After step 403, step 406 is performed.

Step 404: Send the signal quality threshold and identity information of the non-Chiba cell to the user equipment.

Sending an identity of the non-Chiba cell to the user equipment may function as an indication, that is, it is indicated that only user equipment in the cell identified by the non-Chiba cell identity receives the signal quality threshold, and chooses according to the signal quality threshold whether to reselect a Chiba cell.

Step 405: Receive, based on the X2 interface, the signal quality threshold for Chiba cell reselection and the identity information of the non-Chiba cell that are sent by a non-Chiba base station to which the neighboring non-Chiba cell belongs.

If the non-Chiba base station also generates a corresponding signal quality threshold, for example, the non-Chiba cell reselection lower limit value in the foregoing embodiment, the non-Chiba base station may also synchronize the signal quality threshold to a neighboring Chiba base station by using the standard X2 interface, so that the Chiba base station may simultaneously send multiple signal quality thresholds to the user equipment.

Step 406: Send the signal quality threshold for Chiba cell reselection and the cell identity information to the user equipment in a broadcast manner.

The base station may send the signal quality threshold for Chiba cell reselection to the user equipment in a broadcast manner, for example, send the signal quality threshold on a broadcast control channel (BCCH) in a broadcast manner or send the signal quality threshold in a broadcast manner by mapping the signal quality threshold to a physical downlink shared channel (PDSCH).

Step 407: Communicate with the user equipment, so that the user equipment performs cell reselection between the Chiba cell and the non-Chiba cell according to the signal quality threshold.

In this embodiment of the present disclosure, an identity of a corresponding cell is sent to user equipment, so that targeted selection is performed by using the identity of the cell when the UE performs cell reselection, improving the efficiency and accuracy of cell reselection.

Embodiment 4

Figure 5:
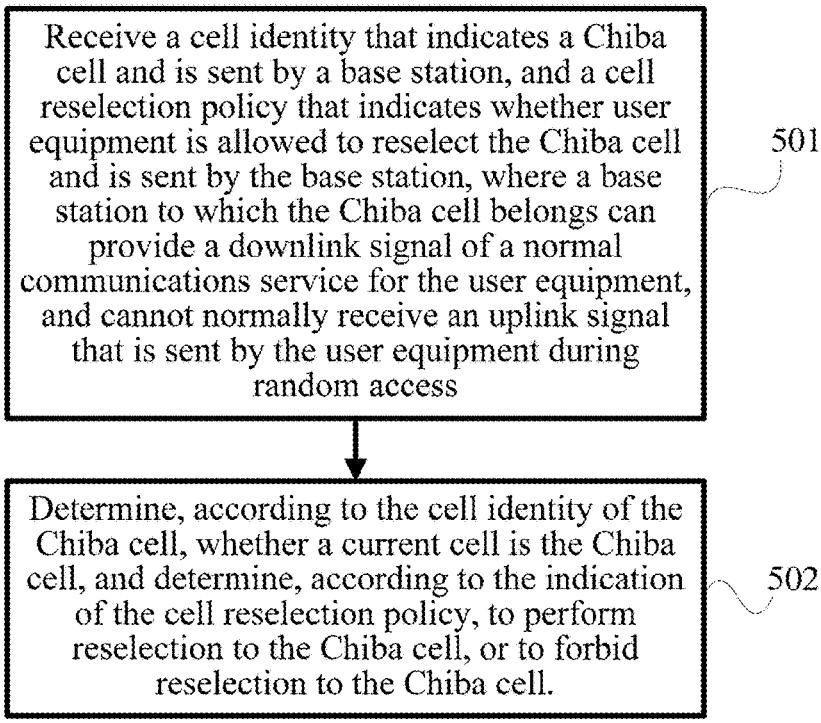
FIG. 5 is a flowchart of Embodiment 4 of a cell reselection method according to the present disclosure.

FIG. 5 is a flowchart of Embodiment 4 of a cell reselection method according to the present disclosure. The method in this embodiment is applicable to a situation in which a Chiba cell exists in a wireless communications system, and the wireless communications system includes a base station and user equipment. The method is executed by a cell reselection apparatus, and the apparatus can be implemented in a form of hardware or software, and may be configured on the user equipment, for example, a smart phone or a tablet computer in the wireless communications system. As shown in FIG. 5, the method specifically includes the following steps:

Step 501: Receive a cell identity that indicates a Chiba cell and is sent by the base station, and a cell reselection policy that indicates whether the user equipment is allowed to reselect the Chiba cell and is sent by the base station, where a base station to which the Chiba cell belongs can provide a downlink signal of a normal communications service for the user equipment, and cannot normally receive an uplink signal that is sent by the user equipment during random access.

In this step, the Chiba cell includes the Chiba cell described in any one of the foregoing embodiments, and is not described herein again.

Step 502: Determine, according to the cell identity of the Chiba cell, whether a current cell is the Chiba cell, and determine, according to the indication of the cell reselection policy, to perform reselection to the Chiba cell, or to forbid reselection to the Chiba cell.

The user equipment first determines whether an identity of a cell to be reselected is the cell identity of the Chiba cell, and if the identity of the cell to be reselected is the cell identity of the Chiba cell, performs reselection to the Chiba cell according to the received indication information; or the user equipment does not perform reselection to the Chiba cell any more.

In this embodiment, before cell reselection, the user equipment receives the cell identity that indicates the Chiba cell and is sent by the base station, and the cell reselection policy that indicates whether the user equipment is allowed to reselect the cell and is sent by the base station, which implements targeted selection during cell reselection, and resolves a problem that the user equipment repeatedly performs reselection between the Chiba cell and the non-Chiba cell.

Further, based on this embodiment, the receiving a cell identity that indicates a Chiba cell and is sent by a base station, and a cell reselection policy that indicates whether user equipment is allowed to reselect the Chiba cell and is sent by the base station includes:

receiving the identity of the Chiba cell, an allowed access failure threshold, and an indication that reselecting another cell is allowed that are sent by a Chiba base station to which the Chiba cell belongs; and correspondingly, the determining, according to the indication of the cell reselection policy, to perform reselection to the Chiba cell, or to forbid reselection to the Chiba cell includes:

if it is determined that a quantity of failures of the user equipment in accessing the Chiba cell corresponding to the identity of the Chiba cell exceeds the allowed access failure threshold, performing reselection to another cell; or if it is determined that a quantity of failures of the user equipment in accessing the Chiba cell corresponding to the identity of the Chiba cell does not exceed the allowed access failure threshold, performing reselection to the Chiba cell.

According to the foregoing technical solution, according to the received indication that the user equipment is allowed to reselect another cell, during reselection, the user equipment can select a cell in addition to the Chiba cell corresponding to the identity of the Chiba cell, so as to resolve a problem that service interruption is caused by reselecting the Chiba cell.

Further, based on this embodiment, the receiving a cell identity that indicates a Chiba cell and is sent by a base station, and a cell reselection policy that indicates whether user equipment is allowed to reselect the Chiba cell and is sent by the base station includes:

receiving the identity of the Chiba cell and the allowed access failure threshold that are sent by a non-Chiba base station to which a non-Chiba cell neighboring to the Chiba cell belongs; and correspondingly, the determining, according to the indication of the cell reselection policy, to perform reselection to the Chiba cell, or to forbid reselection to the Chiba cell includes:

if it is determined that a quantity of failures of the user equipment in accessing the Chiba cell corresponding to the identity of the Chiba cell exceeds the allowed access failure threshold, forbidding reselection to the Chiba cell; or if it is determined that a quantity of failures of the user equipment in accessing the Chiba cell corresponding to the identity of the Chiba cell does not exceed the allowed access failure threshold, performing reselection to the Chiba cell.

According to the foregoing technical solution, when performing cell reselection, the user equipment selects, as a reselected cell, a cell except the cell corresponding to the cell identity indicating the Chiba cell, which avoids using the Chiba cell as the reselected cell again.

Optionally, in the foregoing steps, the allowed access failure threshold may also be configured on a user equipment side by the user equipment according to an attribute feature of the user equipment, which reduces steps of signal exchange between the base station and the user equipment, and improves the efficiency of determining during cell reselection by the user equipment.

Embodiment 5

Figure 6:
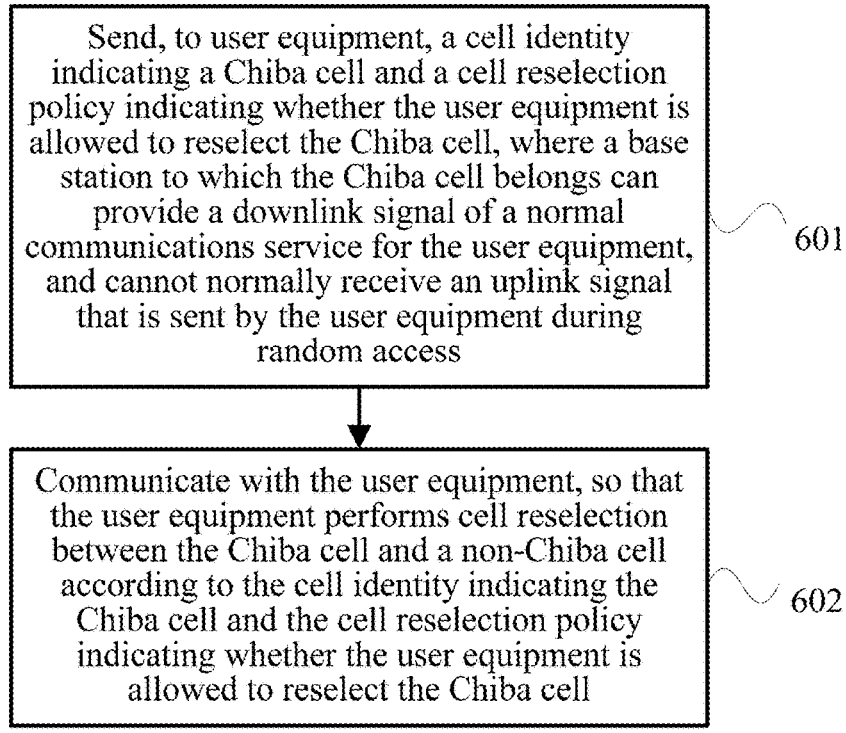
FIG. 6 is a flowchart of Embodiment 5 of a cell reselection method according to the present disclosure.

FIG. 6 is a flowchart of Embodiment 5 of a cell reselection method according to the present disclosure. The method in this embodiment is applicable to a situation in which a Chiba cell exists in a wireless communications system, and the wireless system includes a base station and user equipment. The method is executed by a cell reselection apparatus, and the apparatus can be implemented in a form of hardware or software, and may be configured on the base station, for example, in an eNB of LTE in the wireless communications system. As shown in FIG. 6, the method specifically includes the following steps:

Step 601: Send, to the user equipment, a cell identity indicating a Chiba cell and a cell reselection policy indicating whether the user equipment is allowed to reselect the Chiba cell, where a base station to which the Chiba cell belongs can provide a downlink signal of a normal communications service for the user equipment, and cannot normally receive an uplink signal that is sent by the user equipment during random access.

In this step, the Chiba cell includes the Chiba cell described in any one of the foregoing embodiments, and is not described herein again.

The cell reselection policy indicating whether the user equipment is allowed to reselect the cell may be determined according to a network status or other conditions, and the base station sets whether the user equipment is allowed to perform cell reselection. If the user equipment is allowed to perform cell reselection, after random access fails, the user equipment chooses to perform cell reselection.

It should be noted that, if the Chiba cell is congested, indication information is sent to the user equipment so that the user equipment is not allowed to select the Chiba cell during cell reselection.

Step 602: Communicate with the user equipment, so that the user equipment performs cell reselection between the Chiba cell and a non-Chiba cell according to the cell identity indicating the Chiba cell and the cell reselection policy indicating whether the user equipment is allowed to reselect the Chiba cell.

In this step, the user equipment determines, according to the cell identity indicating the Chiba cell and the cell reselection policy indicating whether the user equipment is allowed to reselect the Chiba cell, whether to perform reselection and determines a reselected cell. If the user equipment determines that the policy and the indication information are met, the user equipment acquires a broadcast message, and directly camps on the Chiba cell, so as to wait the base station to which the Chiba cell belongs to send a downlink broadcast signal, or the user equipment actively sends a cell reselection signal, for example, a random access signal, to the Chiba base station to which the Chiba cell belongs.

As compared with the prior art in which when performing cell reselection, user equipment performs cell reselection only according to a simple determining condition, for example, a result of comparison between downlink signal quality of cells, and this may lead to service interruption, in this embodiment of the present disclosure, a base station sends a cell identity indicating a Chiba cell and a cell reselection policy indicating whether the user equipment is allowed to reselect the cell, so that the UE selects a reselected cell in a targeted manner during cell reselection, and a problem that service interruption is caused by blindly selecting the Chiba cell by the UE during cell reselection is resolved.

Embodiment 6

Figure 7:
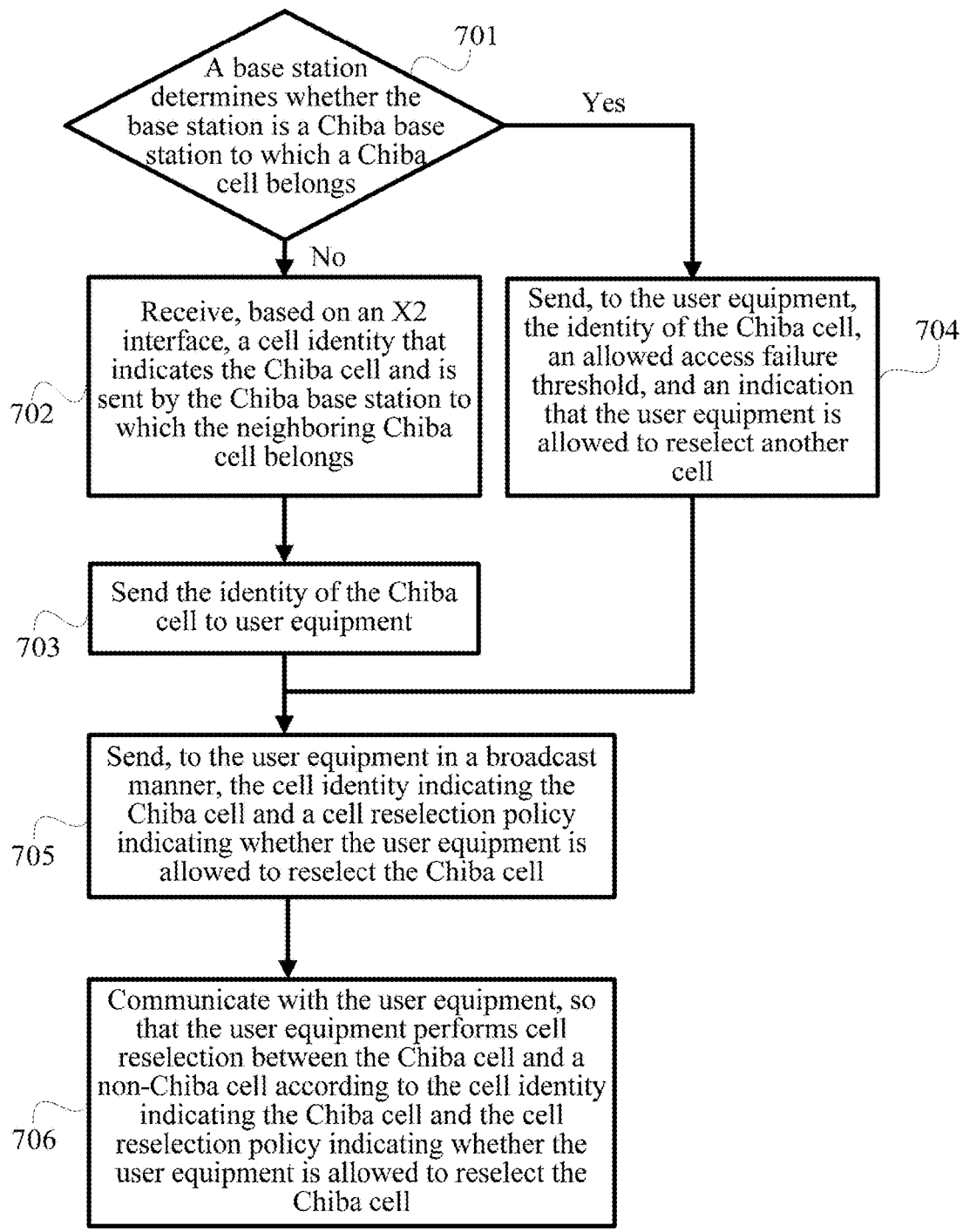
FIG. 7 is a flowchart of Embodiment 6 of a cell reselection method according to the present disclosure.

FIG. 7 is a flowchart of Embodiment 6 of a cell reselection method according to the present disclosure. Based on Embodiment 5, it is added to this embodiment that an allowed access failure threshold can be set. As shown in FIG. 7, the method in this embodiment specifically includes the following steps:

Step 701: A base station determines whether the base station is a Chiba base station to which a Chiba cell belongs.

The base station first determines whether the base station is the Chiba base station, and if the base station is not the Chiba base station, step 702 is performed, or if the base station is the Chiba base station, step 704 is performed.

Step 702: Receive, based on an X2 interface, a cell identity that indicates the Chiba cell and is sent by the Chiba base station to which the neighboring Chiba cell belongs.

Step 703: Send the identity of the Chiba cell to user equipment.

A non-Chiba base station sends, to the user equipment in a broadcast manner, an indication that reselection to the Chiba cell is forbidden, to prevent the user equipment from selecting the Chiba cell again during reselection, which eliminates an unnecessary ping-pong problem. After this step, step 705 is performed.

Step 704: Send, to the user equipment, the identity of the Chiba cell, an allowed access failure threshold, and an indication that the user equipment is allowed to reselect another cell.

Step 705: Send, to the user equipment in a broadcast manner, the cell identity indicating the Chiba cell and a cell reselection policy indicating whether the user equipment is allowed to reselect the Chiba cell.

The base station may send a signal quality threshold for Chiba cell reselection to the user equipment in a broadcast manner, for example, send the signal quality threshold on a BCCH in a broadcast manner or send the signal quality threshold in a broadcast manner by mapping the signal quality threshold to a PDSCH.

The identity of the Chiba cell and the indication that the user equipment is allowed to reselect another cell are sent to the user equipment in a broadcast manner, so that during next cell reselection, the user equipment does not select the cell corresponding to the identity of the Chiba cell again but selects another cell, which resolves a problem that service interruption is caused by selecting the Chiba cell.

Step 706: Communicate with the user equipment, so that the user equipment performs cell reselection between the Chiba cell and a non-Chiba cell according to the cell identity indicating the Chiba cell and the cell reselection policy indicating whether the user equipment is allowed to reselect the Chiba cell.

In this embodiment of the present disclosure, a Chiba base station to which a Chiba cell belongs compares a set allowed access failure threshold with a quantity of user equipment access failures, so that user equipment receives related indication information of the base station before cell reselection, which avoids repeatedly selecting the Chiba cell that cannot provide a service, and improves the efficiency and accuracy of cell reselection.

Embodiment 7

FIG. 8 is a flowchart of Embodiment 7 of a cell reselection method according to the present disclosure. The method in this embodiment is applicable to a situation in which a Chiba cell exists in a wireless communications system, and the wireless communications system includes a base station and user equipment. The method is executed by a cell reselection apparatus, and the apparatus can be implemented in a form of hardware or software, and may be configured on the user equipment, for example, a smart phone or a tablet computer in the wireless communications system. As shown in FIG. 8, the method specifically includes the following steps:

Step 801: Receive at least one reselection time limit value that is sent by the base station and corresponds to a moving speed of the user equipment or a type of the user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot normally receive an uplink signal that is sent by the user equipment during random access.

In this step, the base station allocates different reselection time limits according to user equipments of different types or having different speeds. Using different speeds as an example, moving speeds of UEs may be defined as a high speed, an intermediate speed, and a low speed. For example, a UE whose speed is lower than 10 kilometers per hour is defined as a low-speed UE, a UE whose speed is from 10 kilometers to 40 kilometers per hour is defined as an intermediate-speed UE, and a UE whose speed is higher than 40 kilometers per hour is defined as a high-speed UE. The UE having a high speed may quickly enter a normal service range of the Chiba cell. The normal service range is a normal service range in which the base station can normally communicate with the UE in both an uplink and a downlink. The UE having a low speed may take a long time to enter the normal service range of the Chiba cell. Therefore, a relatively short time limit may be allocated to the UE having a high speed, for example, a timer with long duration is set, while a relatively long time limit is allocated to the UE having a low speed. A corresponding timer is set, according to a time limit, for the UE for forbidding reselection to the Chiba cell.

Step 802: Select the reselection time limit value according to the moving speed or the user equipment type of the user equipment, and forbid, within a time of the reselection time limit value, reselection to the Chiba cell.

If the user equipment identifies that the moving speed or the user equipment type of the user equipment corresponds to the reselection time limit value, the user equipment forbids, within the time of the reselection time limit value, reselection to the Chiba cell, which avoids a ping-pong problem caused by keeping repeatedly performing cell reselection to the Chiba cell by the user equipment.

In this embodiment, the reselection time limit value is received, so that when performing cell reselection, the user equipment determines, according to the reselection time limit value, whether a cell is selected for reselection within a period of time, so as to resolve a problem that service interruption is caused by blind selection of the UE during cell reselection.

Further, based on this embodiment, the selecting the reselection time limit value according to the moving speed or the user equipment type of the user equipment, and forbidding, within a time of the reselection time limit value, reselection to the Chiba cell includes:

receiving at least one reselection time limit value that is sent by the base station and corresponds to the moving speed or the user equipment type of the user equipment;

selecting a corresponding reselection time limit value according to the moving speed or the user equipment type of the user equipment, and starting timing; and when detecting that the timing reaches the reselection time limit value, performing cell reselection to the Chiba cell.

According to the foregoing technical solution, when performing cell reselection, the user equipment controls a selected cell in combination with the reselection time limit value and the timing, which avoids blindly selecting the Chiba cell within a period of time and causing a waste of wireless resources and the ping-pong problem of repeated reselection between the Chiba cell and a non-Chiba cell.

Further, after the selecting a corresponding reselection time limit value according to the moving speed or the user equipment type of the user equipment, and starting timing, the method further includes:

monitoring a change in the moving speed of the user equipment, and updating or canceling the selected reselection time limit value according to a changed moving speed.

According to the foregoing technical solution, a corresponding reselection time limit value is updated or canceled according to a changed moving speed of user equipment, so as to implement dynamic adjustment of the reselection time limit value.

Embodiment 8

FIG. 9 is a flowchart of Embodiment 8 of a cell reselection method according to the present disclosure. The method in this embodiment is applicable to a situation in which a Chiba cell exists in a wireless communications system, and the wireless communications system includes a base station and user equipment. The method is executed by a cell reselection apparatus, and the apparatus can be implemented in a form of hardware or software, and may be configured on the base station, for example, in an eNB of LTE in the wireless communications system. As shown in FIG. 9, the method includes the following steps:

Step 901: Send, to the user equipment, at least one reselection time limit value corresponding to a moving speed of the user equipment or a type of the user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot normally receive an uplink signal that is sent by the user equipment during random access.

In this step, descriptions of the Chiba cell are consistent with the descriptions of the Chiba cell in any one of the foregoing embodiments, and the Chiba cell is not described herein again.

In this step, for a definition of the moving speed, refer to the explanations and descriptions in the previous embodiment, which is not explained herein again. It should be noted that, the moving speed of the UE may be obtained by measuring by the UE or obtained by detecting by the base station.

In this step, optionally, the base station may send, to the user equipment in a broadcast manner, at least one reselection time limit value corresponding to the moving speed or the user equipment type of the user equipment.

Step 902: Communicate with the user equipment, so that the user equipment performs cell reselection between the Chiba cell and a non-Chiba cell according to the reselection time limit value.

The user equipment does not send a reselection message to the base station within a reselection time limit value, receives a cell broadcast message after the reselection time limit ends, and then camps on the cell, or sends a reselection message to a Chiba base station, for example, a preamble signal for random access. The Chiba base station starts a random access process between the Chiba base station and the user equipment according to the received preamble signal.

In this embodiment, different time limits within which reselection to a Chiba cell is forbidden are allocated to user equipments of different types or having different speeds, so that the user equipments having different speeds or of different types perform cell reselection according to corresponding time limits, so as to resolve a problem in the prior art that service interruption is caused by blindly selecting the Chiba cell by the user equipment during cell reselection.

Embodiment 9

Figure 10:
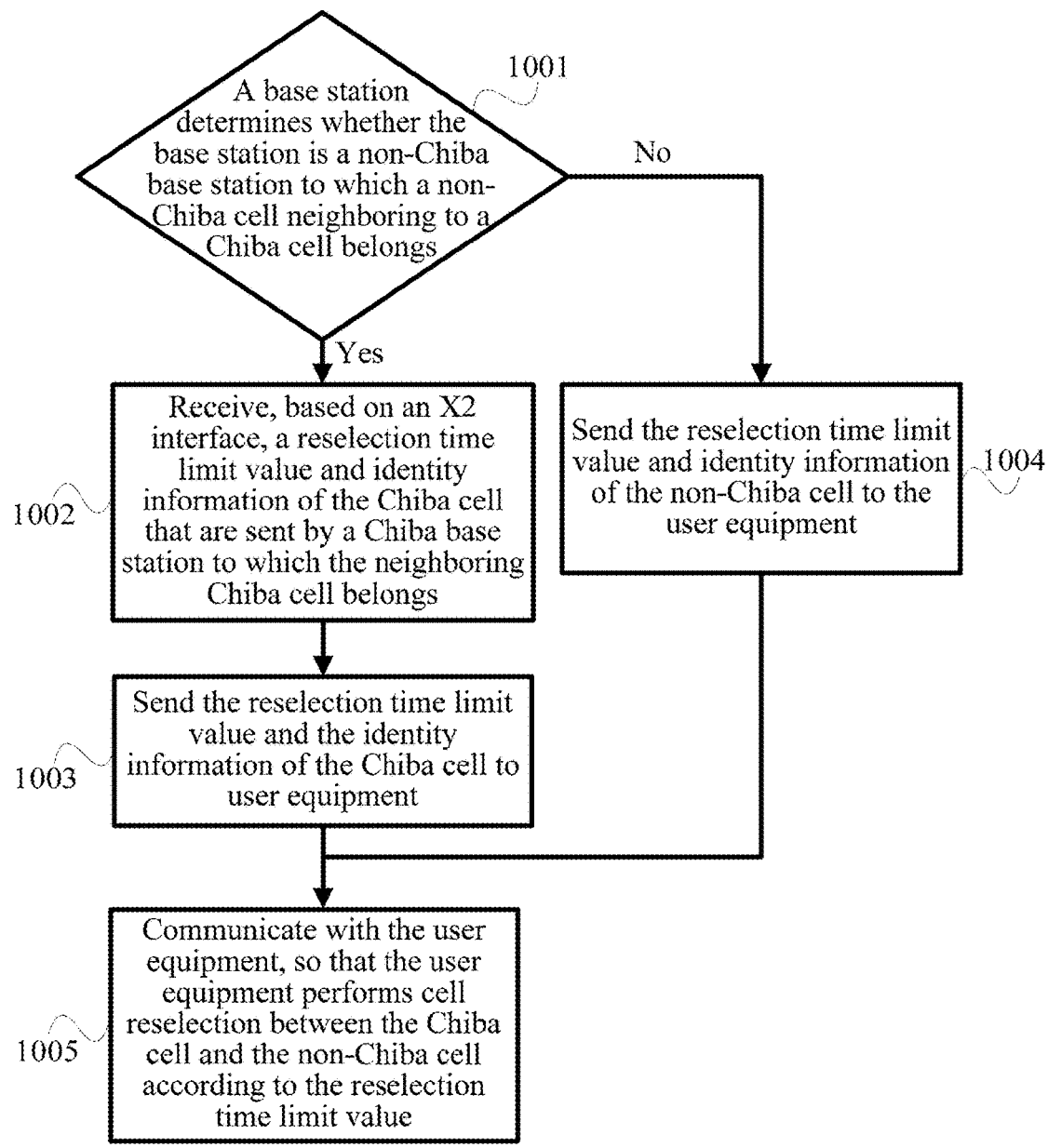
FIG. 10 is a flowchart of Embodiment 9 of a cell reselection method according to the present disclosure.

FIG. 10 is a flowchart of Embodiment 9 of a cell reselection method according to the present disclosure. Based on the previous embodiment, a step of sending a cell identity to user equipment is added to this embodiment. As shown in FIG. 10, this embodiment specifically includes the following steps:

Step 1001: A base station determines whether the base station is a non-Chiba base station to which a non-Chiba cell neighboring to a Chiba cell belongs.

The base station identifies whether the base station is the non-Chiba base station to which the non-Chiba cell belongs, and if the base station is the non-Chiba base station, step 1002 is performed; otherwise, step 1004 is performed.

Step 1002: Receive, based on an X2 interface, a reselection time limit value and identity information of the Chiba cell that are sent by a Chiba base station to which the neighboring Chiba cell belongs.

If the base station is the non-Chiba base station to which the non-Chiba cell belongs, the Chiba base station that allocates the reselection time limit sends the reselection time limit value to the non-Chiba base station by using the standard X2 interface.

Step 1003: Send the reselection time limit value and the identity information of the Chiba cell to user equipment.

If the base station is the non-Chiba base station to which the non-Chiba cell belongs, the base station sends the identity of the Chiba cell to the user equipment, so that the user equipment identifies which Chiba cell a reselection time limit is set for. After this step, step 1005 is performed.

Step 1004: Send the reselection time limit value and identity information of the non-Chiba cell to the user equipment.

In this step, an identity of a specified non-Chiba cell is sent to the user equipment, so that only the UE in the cell corresponding to the identity of the non-Chiba cell performs cell reselection according to the reselection time limit value.

Step 1005: Communicate with the user equipment, so that the user equipment performs cell reselection between the Chiba cell and the non-Chiba cell according to the reselection time limit value.

In this embodiment, an identity of a corresponding cell is sent to the user equipment, so that the UE performs cell reselection according to the identity and the reselection time limit value during cell reselection, so as to implement that the UE performs cell reselection in a targeted manner, and avoid blindly selecting multiple cells.

When RRC connection establishment initiated by the UE fails, the UE performs the following steps:

Step 1: After RRC connection establishment initiated by the UE fails, the UE notifies an upper layer.

Step 2: When determining to trigger the RRC connection establishment again, the upper layer, that is, a non-access stratum (NAS) needs to delay for a period of time; or after receiving a request from the upper layer for triggering the RRC connection establishment again, an RRC layer automatically delays for a period of time, and then sends the RRC connection establishment request to a MAC layer for sending.

Duration of the foregoing delayed period of time may be a time length randomly generated by the UE in a range, for example, a period of time is evenly generated between 1s to 2s; or the time may be configured based on a network side, for example, the network side configures a time value or a value of a period of time for the UE by using a broadcast message or a dedicated message, and the UE then determines a specific value in the period of time.

By means of the foregoing technical solution, UE delays time at which an RRC connection establishment request reaches a bottom layer, so that multiple conflicting UEs can reinitiate RACH processes at different time after congestion occurring in a cell causes that RRC connection establishment initiated by the UEs fails, which achieves an objective of reducing conflicts and relieving congestion.

Embodiment 10

Figure 11:
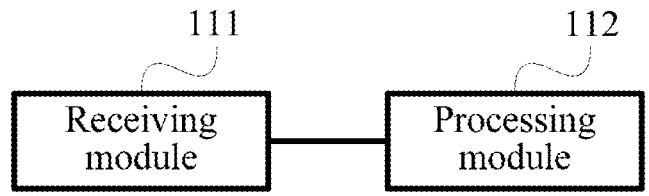
FIG. 11 is a structural diagram of Embodiment 1 of a cell reselection apparatus according to the present disclosure.

FIG. 11 is a structural diagram of Embodiment 1 of a cell reselection apparatus according to the present disclosure. The apparatus can be implemented in a form of hardware or software, and may be configured on user equipment in a wireless communications system. As shown in FIG. 11, the apparatus specifically includes:

a receiving module 111, configured to receive a signal quality threshold, which is sent by a base station, for reselection of a Chiba cell, where a base station to which the Chiba cell belongs can provide a downlink signal of a normal communications service for user equipment, and cannot normally receive an uplink signal that is sent by the user equipment during random access; and a processing module 112, configured to perform determining according to a result of comparison between measured signal quality and the signal quality threshold, where if the result meets a preset reselection condition, the user equipment reselects the Chiba cell from a non-Chiba cell.

Further, based on the previous embodiment, the signal quality threshold, which is received by the receiving module 111, for Chiba cell reselection includes any one or more of the following:

a Chiba cell reselection upper limit value, a non-Chiba cell reselection lower limit value, a Chiba cell reselection offset, and a non-Chiba cell reselection offset.

Preferably, based on the previous embodiment, the processing module 112 is specifically configured to:

if detected signal quality of the Chiba cell is higher than the Chiba cell reselection upper limit value or/and detected signal quality of the non-Chiba cell is lower than the non-Chiba cell reselection lower limit value, perform cell reselection to the Chiba cell; or if detected signal quality of the Chiba cell is higher than a sum of a preset reselection threshold and the Chiba cell reselection offset or/and detected signal quality of the non-Chiba cell is lower than a difference between the preset reselection threshold and the non-Chiba cell reselection offset, perform cell reselection to the Chiba cell.

The apparatus in the foregoing embodiment is configured to perform the technical solution of the method embodiment shown in FIG. 2, of which the implementation principles and technical effects are similar, and details are not described herein again.

Embodiment 11

Figure 12:
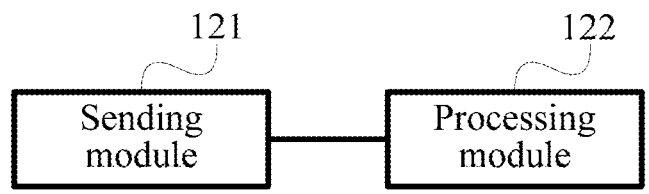
FIG. 12 is a structural diagram of Embodiment 2 of a cell reselection apparatus according to the present disclosure.

FIG. 12 is a structural diagram of Embodiment 2 of a cell reselection apparatus according to the present disclosure. The apparatus can be implemented in a form of hardware or software, and may be configured on a base station in a wireless communications system. As shown in FIG. 12, the apparatus specifically includes:

a sending module 121, configured to send a signal quality threshold for reselection of a Chiba cell to user equipment, where a base station to which the Chiba cell belongs can provide a downlink signal of a normal communications service for the user equipment, and cannot normally receive an uplink signal that is sent by the user equipment during random access; and a processing module 122, configured to communicate with the user equipment, so that the user equipment performs cell reselection between the Chiba cell and a non-Chiba cell according to the signal quality threshold.

The apparatus in this embodiment is configured to perform the technical solution of the method embodiment shown in FIG. 3, of which the implementation principles and technical effects are similar, and details are not described herein again.

Embodiment 12

Figure 13:
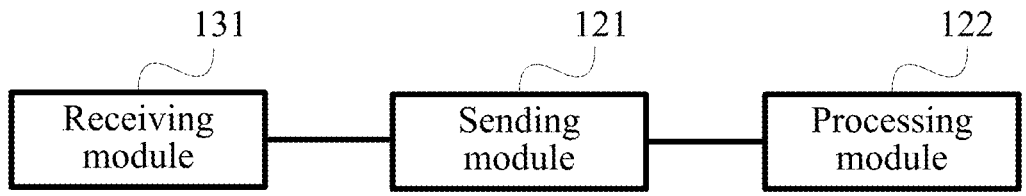
FIG. 13 is a structural diagram of Embodiment 3 of a cell reselection apparatus according to the present disclosure.

FIG. 13 is a structural diagram of Embodiment 3 of a cell reselection apparatus according to the present disclosure. Based on the previous embodiment, a receiving module is added to the apparatus. As shown in FIG. 13, the apparatus specifically includes: the sending module 121, the processing module 122, and a receiving module 131.

A signal quality threshold sent by the sending module 121 includes any one or more of the following:

a Chiba cell reselection upper limit value, a non-Chiba cell reselection lower limit value, a Chiba cell reselection offset, and a non-Chiba cell reselection offset.

Preferably, the sending module 121 is specifically configured to: send the signal quality threshold for Chiba cell reselection to user equipment in a broadcast manner.

Specifically, if a base station is a non-Chiba base station to which a non-Chiba cell neighboring to a Chiba cell belongs, the sending module 121 is specifically configured to: send the signal quality threshold and an identity of the Chiba cell to the user equipment; and if the base station is a Chiba base station to which the Chiba cell neighboring to the non-Chiba cell belongs, the sending module 121 is specifically configured to: send the signal quality threshold and an identity of the non-Chiba cell to the user equipment.

The apparatus further includes:

the receiving module 131, configured to: before the signal quality threshold for Chiba cell reselection is sent to the user equipment, if the base station is the non-Chiba base station to which the non-Chiba cell neighboring to the Chiba cell belongs, receive, based on an X2 interface, the signal quality threshold for Chiba cell reselection sent by the Chiba base station to which the neighboring Chiba cell belongs; or configured to: if the base station is the Chiba base station to which the Chiba cell neighboring to the non-Chiba cell belongs, receive, based on an X2 interface, the signal quality threshold for Chiba cell reselection sent by the non-Chiba base station to which the neighboring non-Chiba cell belongs.

The apparatus in this embodiment is configured to perform the technical solution of the method embodiment shown in FIG. 4, of which the implementation principles and technical effects are similar, and details are not described herein again.

Embodiment 13

Figure 14:
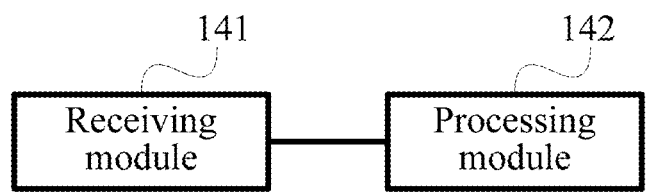
FIG. 14 is a structural diagram of Embodiment 4 of a cell reselection apparatus according to the present disclosure.

FIG. 14 is a structural diagram of Embodiment 4 of a cell reselection apparatus according to the present disclosure. The apparatus can be implemented in a form of hardware or software, and may be configured on user equipment in a wireless communications system. As shown in FIG. 14, the apparatus specifically includes:

a receiving module 141, configured to receive a cell identity that indicates a Chiba cell and is sent by a base station, and a cell reselection policy that indicates whether the user equipment is allowed to reselect the cell and is sent by the base station, where a base station to which the Chiba cell belongs can provide a downlink signal of a normal communications service for the user equipment, and cannot normally receive an uplink signal that is sent by the user equipment during random access; and a processing module 142, configured to determine, according to the cell identity of the Chiba cell, whether a current cell is the Chiba cell, and determine, according to the indication of the cell reselection policy, to perform reselection to the Chiba cell, or to forbid reselection to the Chiba cell.

The apparatus in this embodiment is configured to perform the technical solution of the method embodiment shown in FIG. 5, of which the implementation principles and technical effects are similar, and details are not described herein again.

Specifically, based on this embodiment, the receiving module 141 is specifically configured to:

receive the identity of the Chiba cell, an allowed access failure threshold, and an indication that reselecting another cell is allowed that are sent by a Chiba base station to which the Chiba cell belongs; and correspondingly, the processing module 142 is specifically configured to:

if it is determined that a quantity of failures of the user equipment in accessing the Chiba cell corresponding to the identity of the Chiba cell exceeds the allowed access failure threshold, perform reselection to another cell; and if it is determined that a quantity of failures of the user equipment in accessing the Chiba cell corresponding to the identity of the Chiba cell does not exceed the allowed access failure threshold, perform reselection to the Chiba cell.

Specifically, based on this embodiment, the receiving module 141 is specifically configured to:

receive the identity of the Chiba cell and the allowed access failure threshold that are sent by a non-Chiba base station to which a non-Chiba cell neighboring to the Chiba cell belongs; and correspondingly, the processing module 142 is specifically configured to:

if it is determined that a quantity of failures of the user equipment in accessing the Chiba cell corresponding to the identity of the Chiba cell exceeds the allowed access failure threshold, forbid reselection to the Chiba cell; and if it is determined that a quantity of failures of the user equipment in accessing the Chiba cell corresponding to the identity of the Chiba cell does not exceed the allowed access failure threshold, perform reselection to the Chiba cell.

Embodiment 14

Figure 15:
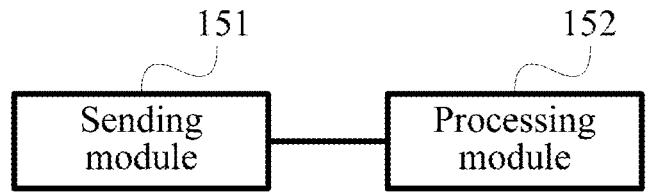
FIG. 15 is a structural diagram of Embodiment 5 of a cell reselection apparatus according to the present disclosure.

FIG. 15 is a structural diagram of Embodiment 5 of a cell reselection apparatus according to the present disclosure. The apparatus can be implemented in a form of hardware or software, and may be configured on a base station in a wireless communications system. As shown in FIG. 15, the apparatus specifically includes:

a sending module 151, configured to send, to user equipment, a cell identity indicating a Chiba cell and a cell reselection policy indicating whether the user equipment is allowed to reselect the Chiba cell, where a base station to which the Chiba cell belongs can provide a downlink signal of a normal communications service for the user equipment, and cannot normally receive an uplink signal that is sent by the user equipment during random access; and a processing module 152, configured to communicate with the user equipment, so that the user equipment performs cell reselection between the Chiba cell and a non-Chiba cell according to the cell identity indicating the Chiba cell and the cell reselection policy indicating whether the user equipment is allowed to reselect the Chiba cell.

The apparatus in this embodiment is configured to perform the technical solution of the method embodiment shown in FIG. 6, of which the implementation principles and technical effects are similar, and details are not described herein again.

Embodiment 15

Figure 16:
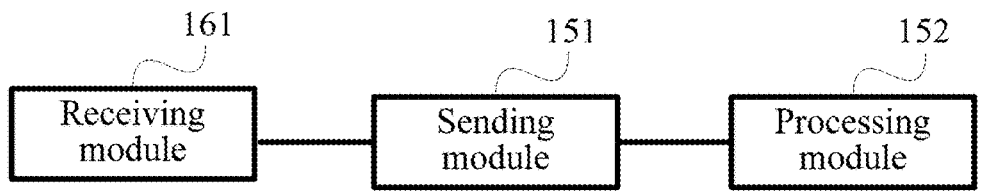
FIG. 16 is a structural diagram of Embodiment 6 of a cell reselection apparatus according to the present disclosure.

FIG. 16 is a structural diagram of Embodiment 6 of a cell reselection apparatus according to the present disclosure. Based on the previous embodiment, a receiving module is added to the apparatus. As shown in FIG. 16, the apparatus specifically includes: the sending module 151, the processing module 152, and a receiving module 161.

If a base station is a Chiba base station to which a Chiba cell belongs, the sending module 151 is specifically configured to:

send, to user equipment, an identity of the Chiba cell, an allowed access failure threshold, and an indication that the user equipment is allowed to reselect another cell.

If the base station is a non-Chiba base station to which a non-Chiba cell neighboring the Chiba cell belongs, the sending module 151 is specifically configured to:

send the identity of the Chiba cell and the allowed access failure threshold to the user equipment.

The apparatus further includes: the receiving module 161, configured to: before the sending module determines whether a quantity of failures of the user equipment in accessing the Chiba base station to which the Chiba cell belongs reaches a quantity of allowed access failures, receive, based on an X2 interface, the cell identity indicating the Chiba cell and a quantity of allowed access failures that are sent by the Chiba base station to which the neighboring Chiba cell belongs.

The sending module 151 is specifically configured to:

send, to the user equipment in a broadcast manner, the cell identity indicating the Chiba cell and a cell reselection policy indicating whether the user equipment is allowed to reselect the Chiba cell.

The apparatus in the foregoing embodiment is configured to perform the technical solution of the method embodiment shown in FIG. 7, of which the implementation principles and technical effects are similar, and details are not described herein again.

Embodiment 16

Figure 17:
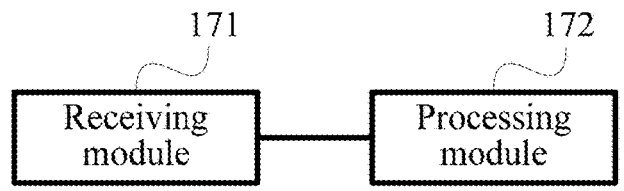
FIG. 17 is a structural diagram of Embodiment 7 of a cell reselection apparatus according to the present disclosure.

FIG. 17 is a structural diagram of Embodiment 7 of a cell reselection apparatus according to the present disclosure. The apparatus can be implemented in a form of hardware or software, and may be configured on user equipment in a wireless communications system. As shown in FIG. 17, the apparatus specifically includes:

a receiving module 171, configured to receive at least one reselection time limit value that is sent by a base station and corresponds to a moving speed of the user equipment or a type of the user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot normally receive an uplink signal that is sent by the user equipment during random access; and a processing module 172, configured to select the reselection time limit value according to the moving speed or the user equipment type of the user equipment, and forbid, within a time of the reselection time limit value, reselection to the Chiba cell.

The apparatus in the foregoing embodiment is configured to perform the technical solution of the method embodiment shown in FIG. 8, of which the implementation principles and technical effects are similar, and details are not described herein again.

Further, based on this embodiment, the processing module 172 includes:

a receiving unit, configured to receive at least one reselection time limit value that is sent by the base station and corresponds to the moving speed or the user equipment type of the user equipment;

a timing start unit, configured to select a corresponding reselection time limit value according to the moving speed or the user equipment type of the user equipment, and start timing; and a performing unit, configured to: when it is detected that the timing reaches the reselection time limit value, perform cell reselection to the Chiba cell.

Further, the processing module 172 further includes:

an update unit, configured to: after the timing start unit selects the corresponding reselection time limit value according to the moving speed or the user equipment type of the user equipment, and starts the timing, monitor a change of the moving speed of the user equipment, and update or cancel the selected reselection time limit value according to a changed moving speed.

Embodiment 17

Figure 18:
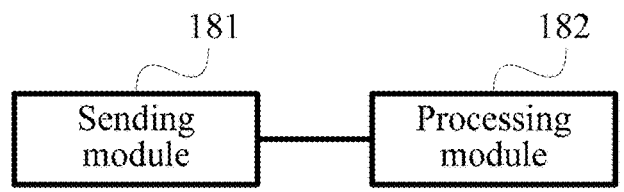
FIG. 18 is a structural diagram of Embodiment 8 of a cell reselection apparatus according to the present disclosure.

FIG. 18 is a structural diagram of Embodiment 8 of a cell reselection apparatus according to the present disclosure. The apparatus can be implemented in a form of hardware or software, and may be configured on a base station in a wireless communications system. As shown in FIG. 18, the apparatus specifically includes:

a sending module 181, configured to send, to user equipment, at least one reselection time limit value corresponding to a moving speed of the user equipment or a type of the user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot normally receive an uplink signal that is sent by the user equipment during random access; and a processing module 182, configured to communicate with the user equipment, so that the user equipment performs cell reselection between the Chiba cell and a non-Chiba cell according to the reselection time limit value.

The apparatus in the foregoing embodiment is configured to perform the technical solution of the method embodiment shown in FIG. 9, of which the implementation principles and technical effects are similar, and details are not described herein again.

Embodiment 18

Figure 19:
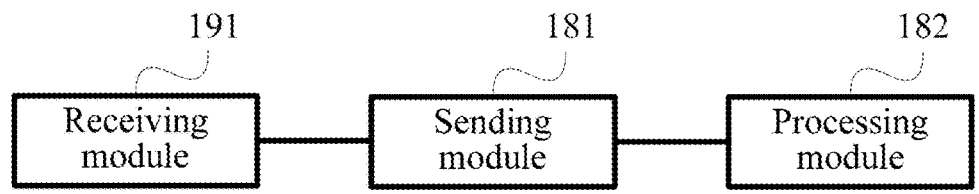
FIG. 19 is a structural diagram of Embodiment 9 of a cell reselection apparatus according to the present disclosure.

FIG. 19 is a structural diagram of Embodiment 9 of a cell reselection apparatus according to the present disclosure. Based on the previous embodiment, a receiving module is added to the apparatus. As shown in FIG. 19, the apparatus specifically includes: the sending module 181, the processing module 182, and a receiving module 191.

The sending module 181 is specifically configured to: send a reselection time limit value to user equipment in a broadcast manner.

If the base station is a Chiba base station to which a Chiba cell neighboring to a non-Chiba cell belongs, the sending module 181 is specifically configured to: send the reselection time limit value and identity information of the non-Chiba cell to the user equipment.

If the base station is a non-Chiba base station to which the non-Chiba cell neighboring to the Chiba cell belongs, the sending module 181 is specifically configured to: send the reselection time limit value and identity information of the Chiba cell to the user equipment.

The apparatus further includes:

the receiving module 191, configured to: before the sending module sends the reselection time limit value and the identity information of the Chiba cell to the user equipment, receive, based on an X2 interface, the reselection time limit value and the identity information of the Chiba cell that are sent by the Chiba base station to which the neighboring Chiba cell belongs.

The apparatus in the foregoing embodiment is configured to perform the technical solution of the method embodiment shown in FIG. 10, of which the implementation principles and technical effects are similar, and details are not described herein again.

Embodiment 19

Figure 20:
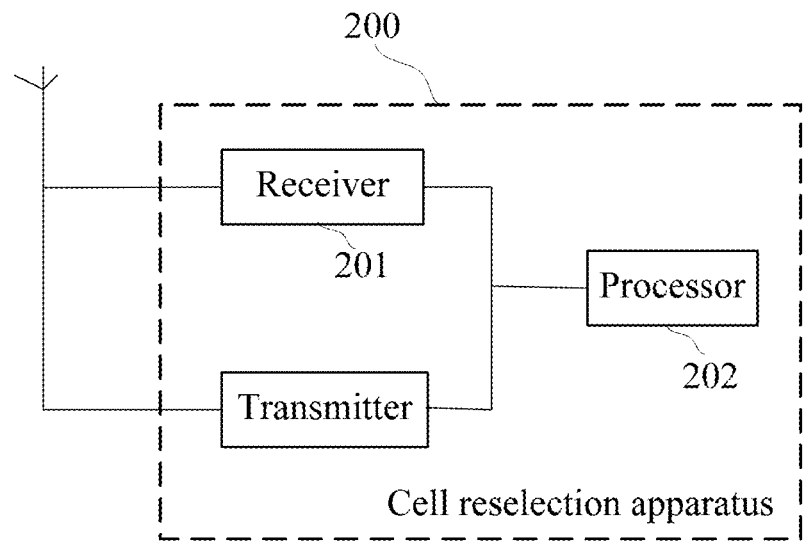
FIG. 20 is a structural diagram of Embodiment 10 of a cell reselection apparatus according to the present disclosure.

FIG. 20 is a structural diagram of Embodiment 10 of a cell reselection apparatus according to the present disclosure. The apparatus can be implemented in a form of hardware or software, and may be configured on user equipment in a wireless communications system. As shown in FIG. 20, the apparatus 200 specifically includes:

a receiver 201, configured to receive a signal quality threshold, which is sent by a base station, for reselection of a Chiba cell, where a base station to which the Chiba cell belongs can provide a downlink signal of a normal communications service for user equipment, and cannot normally receive an uplink signal that is sent by the user equipment during random access; and a processor 202, configured to perform determining according to a result of comparison between measured signal quality and the signal quality threshold, where if the result meets a preset reselection condition, the user equipment reselects the Chiba cell from a non-Chiba cell.

The apparatus in the foregoing embodiment is configured to perform the technical solution of the method embodiment shown in FIG. 2, of which the implementation principles and technical effects are similar, and details are not described herein again.

Embodiment 20

Figure 21:
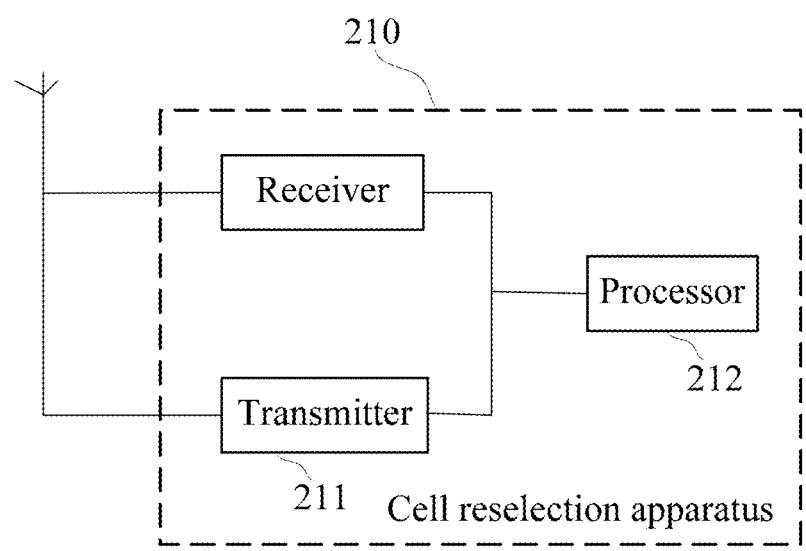
FIG. 21 is a structural diagram of Embodiment 11 of a cell reselection apparatus according to the present disclosure.

FIG. 21 is a structural diagram of Embodiment 11 of a cell reselection apparatus according to the present disclosure. The apparatus can be implemented in a form of hardware or software, and may be configured on a base station in a wireless communications system. As shown in FIG. 21, the apparatus 210 specifically includes:

a transmitter 211, configured to send a signal quality threshold for reselection of a Chiba cell to user equipment, where a base station to which the Chiba cell belongs can provide a downlink signal of a normal communications service for the user equipment, and cannot normally receive an uplink signal that is sent by the user equipment during random access; and a processor 212, configured to communicate with the user equipment, so that the user equipment performs cell reselection between the Chiba cell and a non-Chiba cell according to the signal quality threshold.

The apparatus in the foregoing embodiment is configured to perform the technical solution of the method embodiment shown in FIG. 3, of which the implementation principles and technical effects are similar, and details are not described herein again.

Embodiment 21

Figure 22:
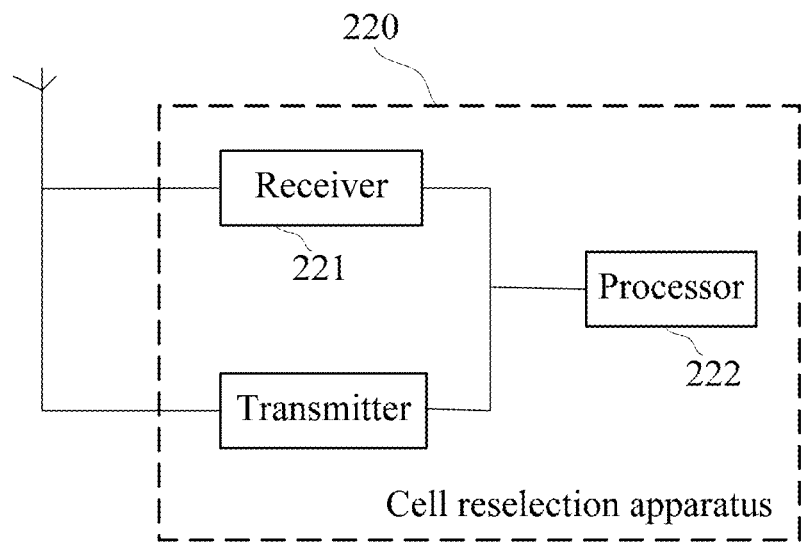
FIG. 22 is a structural diagram of Embodiment 12 of a cell reselection apparatus according to the present disclosure.

FIG. 22 is a structural diagram of Embodiment 12 of a cell reselection apparatus according to the present disclosure. The apparatus can be implemented in a form of hardware or software, and may be configured on user equipment in a wireless communications system. As shown in FIG. 22, the apparatus 220 specifically includes:

a receiver 221, configured to receive a cell identity that indicates a Chiba cell and is sent by a base station, and a cell reselection policy that indicates whether the user equipment is allowed to reselect the Chiba cell and is sent by the base station, where a base station to which the Chiba cell belongs can provide a downlink signal of a normal communications service for the user equipment, and cannot normally receive an uplink signal that is sent by the user equipment during random access; and a processor 222, configured to determine, according to the cell identity of the Chiba cell, whether a current cell is the Chiba cell, and determine, according to the indication of the cell reselection policy, to perform reselection to the Chiba cell, or to forbid reselection to the Chiba cell.

The apparatus in the foregoing embodiment is configured to perform the technical solution of the method embodiment shown in FIG. 4, of which the implementation principles and technical effects are similar, and details are not described herein again.

Embodiment 22

Figure 23:
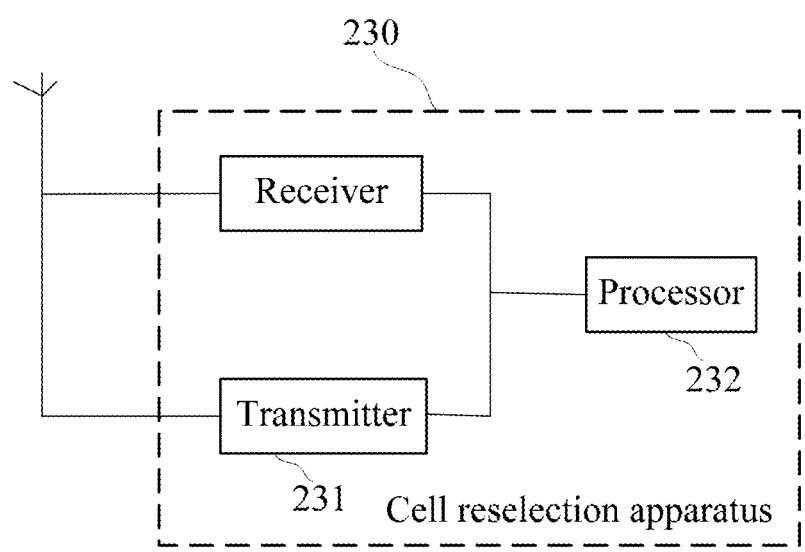
FIG. 23 is a structural diagram of Embodiment 13 of a cell reselection apparatus according to the present disclosure.

FIG. 23 is a structural diagram of Embodiment 13 of a cell reselection apparatus according to the present disclosure. The apparatus can be implemented in a form of hardware or software, and may be configured on a base station in a wireless communications system. As shown in FIG. 23, the apparatus 230 specifically includes:

a transmitter 231, configured to send, to user equipment, a cell identity indicating a Chiba cell and a cell reselection policy indicating whether the user equipment is allowed to reselect the Chiba cell, where a base station to which the Chiba cell belongs can provide a downlink signal of a normal communications service for the user equipment, and cannot normally receive an uplink signal that is sent by the user equipment during random access; and a processor 232, configured to communicate with the user equipment, so that the user equipment performs cell reselection between the Chiba cell and a non-Chiba cell according to the cell identity indicating the Chiba cell and the cell reselection policy indicating whether the user equipment is allowed to reselect the Chiba cell.

The apparatus in the foregoing embodiment is configured to perform the technical solution of the method embodiment shown in FIG. 5, of which the implementation principles and technical effects are similar, and details are not described herein again.

Embodiment 23

Figure 24:
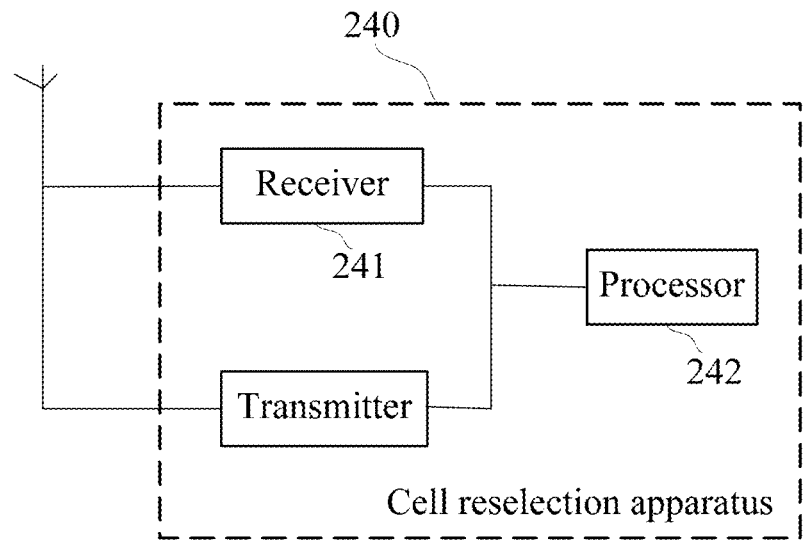
FIG. 24 is a structural diagram of Embodiment 14 of a cell reselection apparatus according to the present disclosure.

FIG. 24 is a structural diagram of Embodiment 14 of a cell reselection apparatus according to the present disclosure. The apparatus can be implemented in a form of hardware or software, and may be configured on user equipment in a wireless communications system. As shown in FIG. 24, the apparatus 240 specifically includes:

a receiver 241, configured to receive at least one reselection time limit value that is sent by a base station and corresponds to a moving speed of the user equipment or a type of the user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot normally receive an uplink signal that is sent by the user equipment during random access; and a processor 242, configured to select the reselection time limit value according to the moving speed or the user equipment type of the user equipment, and forbid, within a time of the reselection time limit value, reselection to the Chiba cell.

The apparatus in the foregoing embodiment is configured to perform the technical solution of the method embodiment shown in FIG. 7, of which the implementation principles and technical effects are similar, and details are not described herein again.

Embodiment 24

Figure 25:
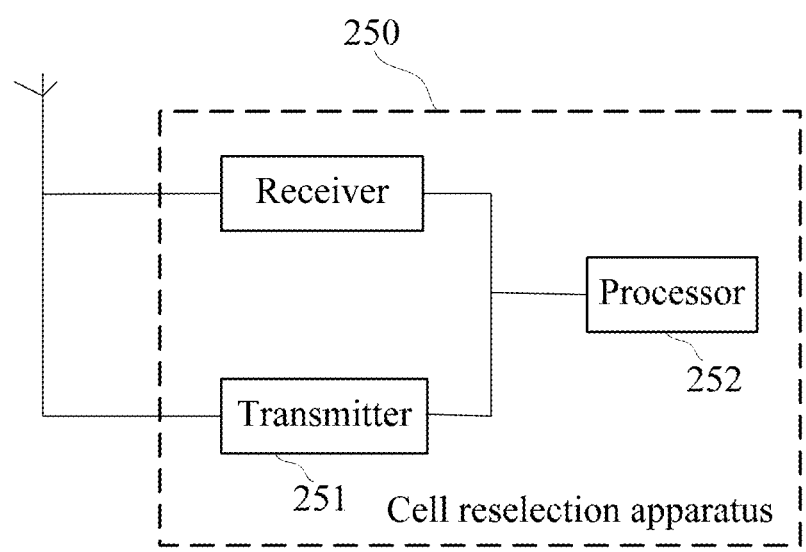
FIG. 25 is a structural diagram of Embodiment 15 of a cell reselection apparatus according to the present disclosure.

FIG. 25 is a structural diagram of Embodiment 15 of a cell reselection apparatus according to the present disclosure. The apparatus can be implemented in a form of hardware or software, and may be configured on user equipment in a wireless communications system. As shown in FIG. 25, the apparatus 250 specifically includes:

a transmitter 251, configured to send, to the user equipment, at least one reselection time limit value corresponding to a moving speed of the user equipment or a type of the user equipment, so as to instruct the user equipment to select the reselection time limit value according to the moving speed or the user equipment type of the user equipment to perform cell reselection on a Chiba cell, where a base station to which the Chiba cell belongs can provide a downlink signal of a normal communications service for the user equipment, and cannot normally receive an uplink signal that is sent by the user equipment during random access; and a processor 252, configured to communicate with the user equipment, so that the user equipment performs cell reselection between the Chiba cell and a non-Chiba cell according to the reselection time limit value.

The apparatus in the foregoing embodiment is configured to perform the technical solution of the method embodiment shown in FIG. 9, of which the implementation principles and technical effects are similar, and details are not described herein again.

Embodiment 25

Figure 26:
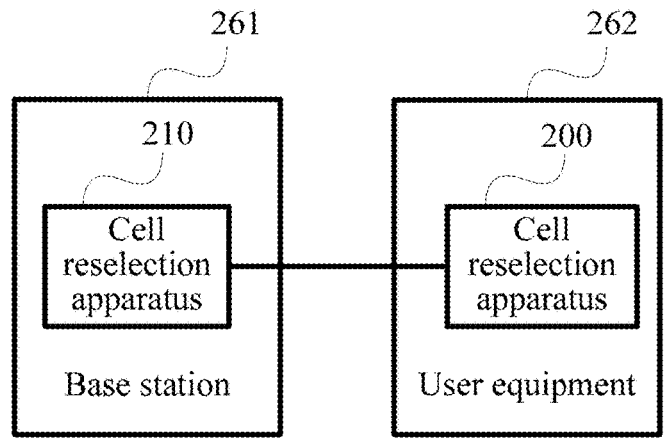
FIG. 26 is an architectural diagram of Embodiment 1 of a cell reselection system according to the present disclosure.

FIG. 26 is an architectural diagram of Embodiment 1 of a cell reselection system according to the present disclosure. As shown in FIG. 26, the system includes:

a base station 261 and user equipment 262, where
the user equipment 262 includes the cell reselection apparatus 200 shown in FIG. 20; and
the base station 261 includes the cell reselection apparatus 210 shown in FIG. 21.

The cell reselection apparatus 200 in this embodiment can correspondingly perform the cell reselection method on a terminal side provided in any embodiment of the present disclosure, of which the implementation principles and technical effects are similar, and details are not described herein again; and the cell reselection apparatus 210 in this embodiment can correspondingly perform the cell reselection method on a base station side provided in any embodiment of the present disclosure, of which the implementation principles and technical effects are similar, and details are not described herein again.

Embodiment 26

Figure 27:
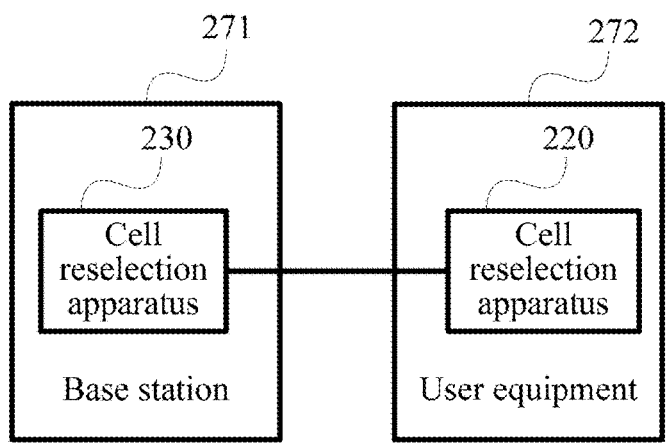
FIG. 27 is an architectural diagram of Embodiment 2 of a cell reselection system according to the present disclosure.

FIG. 27 is an architectural diagram of Embodiment 2 of a cell reselection system according to the present disclosure. As shown in FIG. 27, the system includes:

a base station 271 and user equipment 272, where
the user equipment 272 includes the cell reselection apparatus 220 shown in FIG. 22; and
the base station 271 includes the cell reselection apparatus 230 shown in FIG. 23.

The cell reselection apparatus 220 in this embodiment can correspondingly perform the cell reselection method on a terminal side provided in any embodiment of the present disclosure, of which the implementation principles and technical effects are similar, and details are not described herein again; and the cell reselection apparatus 230 in this embodiment can correspondingly perform the cell reselection method on a base station side provided in any embodiment of the present disclosure, of which the implementation principles and technical effects are similar, and details are not described herein again.

Embodiment 27

Figure 28:
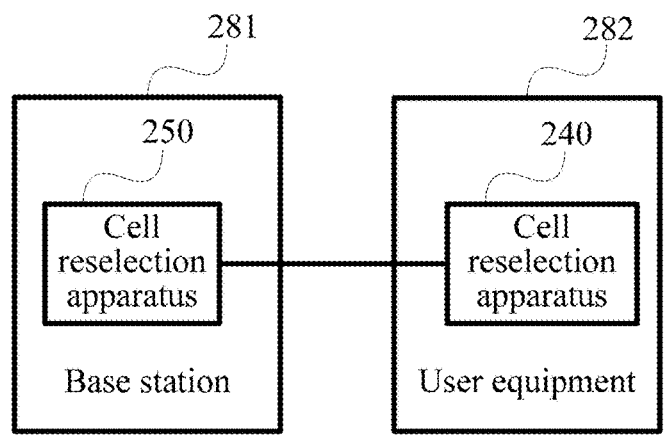
FIG. 28 is an architectural diagram of Embodiment 3 of a cell reselection system according to the present disclosure.

FIG. 28 is an architectural diagram of Embodiment 3 of a cell reselection system according to the present disclosure. As shown in FIG. 28, the system includes:

a base station 281 and user equipment 282, where the user equipment 282 includes the cell reselection apparatus 240 shown in FIG. 24; and the base station 281 includes the cell reselection apparatus 250 shown in FIG. 25.

The cell reselection apparatus 240 in this embodiment can correspondingly perform the cell reselection method on a terminal side provided in any embodiment of the present disclosure, of which the implementation principles and technical effects are similar, and details are not described herein again; and the cell reselection apparatus 250 in this embodiment can correspondingly perform the cell reselection method on a base station side provided in any embodiment of the present disclosure, of which the implementation principles and technical effects are similar, and details are not described herein again.

Embodiment 28

Figure 29:
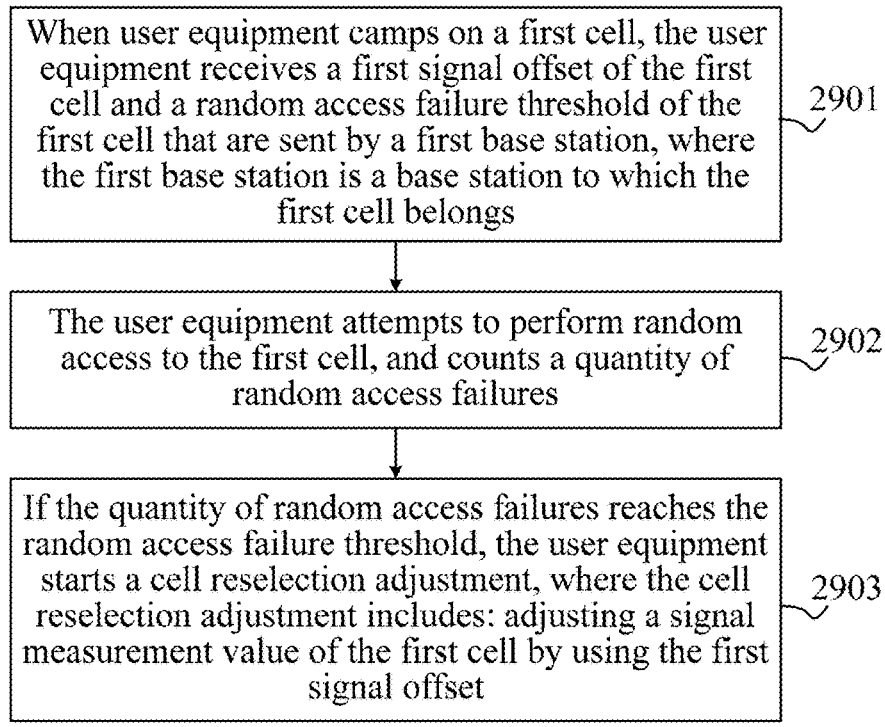
FIG. 29 is a flowchart of a cell access method according to an embodiment of the present disclosure.

FIG. 29 is a flowchart of a cell access method according to an embodiment of the present disclosure. As shown in FIG. 29, the method includes:

2901: When user equipment camps on a first cell, the user equipment receives a first signal offset of the first cell and a random access failure threshold of the first cell that are sent by a first base station, where the first base station is a base station to which the first cell belongs.

2902: The user equipment attempts to perform random access to the first cell, and counts a quantity of random access failures.

2903: If the quantity of random access failures reaches the random access failure threshold, the user equipment starts a cell reselection adjustment, where the cell reselection adjustment includes: adjusting a signal measurement value of the first cell by using the first signal offset.

Optionally, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

The method provided in this embodiment of the present disclosure may be applied to a cell access scenario in a wireless communications system, and the cell access scenario may include cell selection, cell reselection, and random access. The wireless communications system may include at least the first base station and the user equipment, and the user equipment may be a wireless communications device, such as a smart phone or a tablet computer.

An implementation manner of receiving, by the user equipment from the first base station, the first signal offset of the first cell and the random access failure threshold of the first cell may be that: the first base station adds the first signal offset and the random access failure threshold to a broadcast message, and the user equipment acquires the first signal offset and the random access failure threshold from the received broadcast message; or may be that: the user equipment sends a parameter acquiring request to the first base station, and receives a parameter acquiring response that is returned by the first base station and carries the first signal offset and the random access failure threshold.

The first signal offset may be automatically generated by the first base station according to a system operation status, may be acquired by the first base station from another base station, or may be manually configured based on network planning and/or a system operation status; the first signal offset may be a parameter corresponding to a frequency channel number of the first cell, may be a parameter corresponding to a frequency band in which a frequency channel number of the first cell is located, or may be a parameter corresponding to a wireless access technology used by the first cell. The first signal offset is used for starting the cell reselection adjustment by the user equipment if the quantity of random access failures of the user equipment reaches the random access failure threshold, and the cell reselection adjustment includes: adjusting, by the user equipment, the signal measurement value of the first cell by using the first signal offset.

A feasible implementation manner of adjusting, by the user equipment, the signal measurement value of the first cell by using the first signal offset is: subtracting the first signal offset from the signal measurement value of the first cell, to obtain an adjusted value of the signal measurement value of the first cell, where the adjusted value of the signal measurement value of the first cell is lower than the signal measurement value of the first cell, which helps reselect a neighboring cell of the first cell in time by the user equipment.

In this embodiment of the present disclosure, the signal measurement value includes any one or a combination of the following: signal received strength (S), signal received quality (Q), a sequence value (Ls) of a serving cell, and a sequence value (Ln) of a neighboring cell.

In the cell access scenario, for a cell waiting to be selected, for example, a cell P, the sequence value Ls of the serving cell is used for indicating a sequence value when the cell P is used as a serving cell of the user equipment; the sequence value Ln of the neighboring cell is used for indicating a sequence value when the cell P is used as a neighboring cell of the serving cell of the user equipment.

In the prior art, the signal measurement values may be separately obtained according to the following formulas:

1. Cell signal received strength S=Received strength measurement value−Minimum requirement of received strength−Received strength offset when an accessed public land mobile network (PLMN) is camped on−Power compensation;

2. Cell signal received quality Q=Received quality measurement value−Minimum requirement of received quality−Received quality offset when the accessed PLMN is camped on;

3. Sequence value Ls of serving cell=Received strength measurement value+Received strength hysteresis; and 4. Sequence value Ln of neighboring cell=Received strength measurement value−Intra-frequency or inter-frequency signal offset.

In this embodiment of the present disclosure, a specific implementation manner of the cell reselection adjustment may include: adjusting the signal measurement value of the first cell by using the first signal offset (which is recorded as A), to obtain the adjusted value of the signal measurement value of the first cell, and performing cell selection or cell reselection according to the adjusted value of the signal measurement value of the first cell. During specific implementation, for a cell selection method and a cell reselection method, refer to the prior art, for example, refer to an S-criterion used for cell selection, an R-criterion used for cell sequencing, and the like in the prior art.

As an optional implementation manner, the adjusting the signal measurement value of the first cell by using the first signal offset (which is recorded as A), to obtain the adjusted value of the signal measurement value of the first cell may be performed by using the following formulas:

1'. Adjusted value S' of cell signal received strength=Cell signal received strength S−First signal offset A;

2'. Adjusted value Q' of cell signal received quality=Cell signal received quality Q−First signal offset A;

3'. Adjusted value Ls' of sequence value of serving cell=Sequence value Ls of serving cell−First signal offset A; and 4'. Adjusted value Ln' of sequence value of neighboring cell=Sequence value Ln of neighboring cell−First signal offset A.

In this embodiment of the present disclosure, when cell selection or cell reselection is performed according to the adjusted value of the signal measurement value of the first cell, a probability of selecting the first cell to camp on can be decreased. Using cell signal received strength S as an example, an adjustment is performed by using the first signal offset, so that an adjusted value of the cell signal received strength is lower than the cell signal received strength S. It should be noted that, the foregoing formulas are merely exemplary, and do not constitute any limitation to the present disclosure. A person skilled in the art may further obtain other implementation manners based on technical revelations of this embodiment of the present disclosure, for example, changing a formula form (adjusting a plus sign and a minus sign), and using other mathematical processing, which are not listed herein one by one.

In the prior art, after random access to a camping cell fails, by reason of a geographical environment and the like, for example, the camping cell is a Chiba cell, the user equipment may still reselect the current camping cell during cell reselection. When the user equipment attempts to perform random access to the current camping cell again, a random access failure still occurs. If this situation occurs repeatedly, service interruption is caused, and user experience is affected.

By means of the cell access method provided in this embodiment of the present disclosure, after random access to a camping cell fails, user equipment can automatically determine, according to a quantity of random access failures and a random access failure threshold, whether to start a cell reselection adjustment. When the cell reselection adjustment is started, a signal measurement value of the current camping cell can be adjusted according to a first signal offset, and cell selection or cell reselection can be performed according to an adjusted value of the signal measurement value of the first cell. This helps reselect another cell except the current camping cell, avoids service interruption, and improves user experience.

Optionally, based on the cell access method provided in this embodiment of the present disclosure, when the user equipment camps on the first cell, the user equipment may further receive a second signal offset of a second cell sent by the first base station, where the second cell is a neighboring cell of the first cell, and the foregoing cell reselection adjustment further includes: adjusting a signal measurement value of the second cell by using the second signal offset. For example, the second signal offset may be added to the signal measurement value of the second cell, to obtain an adjusted value of the signal measurement value of the second cell, where the adjusted value of the signal measurement value of the second cell may be higher than the signal measurement value of the second cell, which helps reselect the second cell in time by the user equipment. The neighboring cell of the first cell may include an intra-frequency neighboring cell and/or an inter-frequency neighboring cell of the first cell. After the optional implementation manner is used, the user equipment can perform cell selection or cell reselection according to the adjusted value of the signal measurement value of the first cell and the adjusted value of the signal measurement value of the second cell, which not only can decrease the probability of selecting the first cell to camp on, but also can increase a probability of selecting the second cell to camp on. Further, an improved solution of this embodiment may be that: when the user equipment camps on the first cell, the user equipment receives the second signal offset of the second cell sent by the first base station, and particularly, the cell reselection adjustment is improved to be: skipping, by the user equipment, adjusting the signal measurement value of the first cell by using the first signal offset, and adjusting, by the user equipment, the signal measurement value of the second cell by using the second signal offset. When the user equipment performs reselection, the first cell is considered as a blocked cell, and is not used as a reselection target. This helps the user equipment to reselect the second cell in time, avoids that the user equipment still reselects the first cell, avoids service interruption, and improves user experience.

Optionally, based on the cell access method provided in the foregoing embodiment, after the user equipment performs cell reselection, the user equipment may select the second cell to camp on, where the second cell is a neighboring cell of the first cell. The cell reselection adjustment further includes: when the user equipment camps on the second cell and performs cell reselection, adjusting the signal measurement value of the first cell by using the first signal offset. For example, the first signal offset is subtracted from the signal measurement value of the first cell, to obtain an adjusted value of the signal measurement value of the first cell, where the adjusted value of the signal measurement value of the first cell is lower than the signal measurement value of the first cell, which prevents the user equipment from reselecting the first cell again from the second cell, and prevents a ping-pong effect.

Optionally, based on the cell access method provided in the foregoing embodiment, when the user equipment camps on the first cell, the user equipment further receives a third signal offset of the first cell sent by the first base station; and after the user equipment performs cell reselection, the user equipment may select the second cell to camp on, where the second cell is a neighboring cell of the first cell. In this case, the cell reselection adjustment may further include: when the user equipment camps on the second cell and performs cell reselection, adjusting the signal measurement value of the first cell by using the third signal offset of the first cell, for example, subtracting the third signal offset from the signal measurement value of the first cell to obtain an adjusted value of the signal measurement value of the first cell, where the adjusted value of the signal measurement value of the first cell is lower than the signal measurement value of the first cell, which prevents the user equipment from reselecting the first cell again from the second cell, and prevents a ping-pong effect.

Optionally, based on the cell access method provided in the foregoing embodiment, after the user equipment performs cell reselection, the user equipment selects the second cell to camp on, where the second cell is a neighboring cell of the first cell. When the user equipment camps on the second cell, the user equipment may further receive a fourth signal offset of the first cell sent by a second base station, where the second base station is a base station to which the second cell belongs. In this case, the cell reselection adjustment may further include: when the user equipment camps on the second cell and performs cell reselection, adjusting the signal measurement value of the first cell by using the fourth signal offset. For example, the fourth signal offset may be subtracted from the signal measurement value of the first cell, to obtain an adjusted value of the signal measurement value of the first cell, where the adjusted value of the signal measurement value of the first cell is lower than the signal measurement value of the first cell, which prevents the user equipment from reselecting the first cell again from the second cell, and prevents a ping-pong effect. It should be noted that, when the first cell and the second cell are different cells belonging to a same base station, the first base station and the second base station may be a same base station. The second base station may receive the fourth signal offset of the first cell from the first base station; in addition, base stations may transmit, by using an existing communications interface, a random access failure threshold provided in any embodiment of the present disclosure and a signal offset used in the cell reselection adjustment.

Optionally, based on the cell access method provided in the foregoing embodiment, after the user equipment performs cell reselection, the user equipment selects the second cell to camp on, where the second cell is a neighboring cell of the first cell. When the user equipment camps on the second cell, the user equipment may further receive a fifth signal offset of the second cell sent by the second base station, where the second base station is a base station to which the second cell belongs. In this case, the cell reselection adjustment may further include: when the user equipment camps on the second cell and performs cell reselection, adjusting the signal measurement value of the second cell by using the fifth signal offset. For example, the fifth signal offset may be added to the signal measurement value of the second cell, to obtain an adjusted value of the signal measurement value of the second cell, where the adjusted value of the signal measurement value of the second cell is higher than the signal measurement value of the second cell, which prevents the user equipment from reselecting the first cell again from the second cell, and prevents a ping-pong effect.

Optionally, based on the cell access method provided in the foregoing embodiment, when the user equipment camps on the first cell, the user equipment may further receive a sixth signal offset of the second cell sent by the first base station, where the second cell is a neighboring cell of the first cell. After the user equipment performs cell reselection, the user equipment selects the second cell to camp on, where the second cell is a neighboring cell of the first cell. When the user equipment camps on the second cell. In this case, the cell reselection adjustment may further include: when the user equipment camps on the second cell and performs cell reselection, adjusting the signal measurement value of the second cell by using the sixth signal offset. For example, the sixth signal offset may be added to the signal measurement value of the second cell, to obtain an adjusted value of the signal measurement value of the second cell, where the adjusted value of the signal measurement value of the second cell is higher than the signal measurement value of the second cell, which prevents the user equipment from reselecting the first cell again from the second cell, and prevents a ping-pong effect.

It should be noted that, values of the first signal offset, the third signal offset, and the fourth signal offset of the first cell may be different, or may be the same, and all may be used for adjusting the signal measurement value of the first cell, which decreases the probability of selecting the first cell to camp on during cell reselection. Values of the fifth signal offset and the sixth signal offset of the second cell may be different, or may be the same, and both may be used for adjusting the signal measurement value of the second cell, which increases the probability of selecting the second cell to camp on.

Based on any one of the foregoing embodiments, as an optional implementation manner, the access method provided in this embodiment of the present disclosure may further include: when the cell reselection adjustment is started, if the user equipment finds, in a current camping cell and a neighboring cell of the current camping cell, no cell meeting a service condition, that is, finds no suitable cell to be camped on, stopping, by the user equipment, the cell reselection adjustment. The service condition may be the S-criterion or the R-criterion in cell selection or cell reselection in the prior art. The current camping cell may be the first cell, or may be the second cell. After stopping the cell reselection adjustment, the user equipment may continue to use the cell selection method or the cell reselection method in the prior art, to perform cell selection or cell reselection according to the signal measurement value of the first cell and the signal measurement value of the second cell.

Alternatively, based on any one of the foregoing embodiments, as an optional implementation manner, the cell access method provided in this embodiment of the present disclosure may further include: acquiring, by the user equipment, a camping cell change quantity threshold, and after the user equipment starts the cell reselection adjustment in any one of the foregoing embodiments, counting, by the user equipment, a quantity of changes of a camping cell; and when a quantity of changes of a camping cell reaches the camping cell change quantity threshold, stopping, by the user equipment, the cell reselection adjustment. The quantity of changes of a camping cell indicates quantities of changes of a current camping cell and a previous camping cell after the user equipment performs cell reselection.

The camping cell may be the first cell, or may be the second cell. An implementation manner of acquiring, by the user equipment, the camping cell change quantity threshold or a signal threshold of the camping cell includes at least: (1) The user equipment receives the threshold, which is sent by the first base station or the second base station, of a quantity of changes of a camping cell. (2) The user equipment uses a default value of the camping cell change quantity threshold.

For example, it is assumed that the camping cell change quantity threshold is 2, and an initial number of changes of a camping cell is set to 0. After random access to the first cell fails, the user equipment starts the cell reselection adjustment, and reselects the second cell from the first cell. In this case, a quantity of changes of a camping cell increases by 1, and in this case, a quantity of changes of a camping cell is 1. After that, when the user equipment camps on the second cell and performs cell reselection, the user equipment reselects the first cell again from the second cell, and a quantity of changes of a camping cell increases by 1 again. In this case, a quantity of changes of a camping cell is 2, a quantity of changes of a camping cell reaches the camping cell change quantity threshold, and the user equipment stops the cell reselection adjustment.

In the foregoing two optional implementation manners, after starting the cell reselection adjustment, the user equipment may further stop the cell reselection adjustment in time according to whether a suitable cell to be camped on exists or according to a value of a quantity of changes of a camping cell, so as to continue to use the cell selection method or the cell reselection method in the prior art. By using the foregoing two optional implementation manners, robustness of the cell access method can be improved, dynamically adapting to an environment change. For example, it is assumed that, at the beginning, the user equipment camps on the first cell, the first cell is a Chiba cell, when the user equipment attempts to access the first cell, a random access failure occurs, and after the cell reselection adjustment is started, reselection may be performed to the second cell; after a period of time, because an environment or another factor of the first cell changes, the first cell becomes a non-Chiba cell, and in this case, the first cell can provide a random access service for the user equipment, and the cell reselection adjustment can be stopped, which helps select the first cell to camp on.

Optionally, when the user equipment camps on the first cell, the user equipment receives the random access failure threshold of the first cell and at least two sets of service access parameters that separately correspond to different service classes, which are sent by the first base station, where the first base station is a base station to which the first cell belongs. When performing cell access, the user equipment determines, in the at least two sets of service access parameters according to a service class of the user equipment, a first service access parameter matching the service class of the user equipment, and performs cell access according to the first service access parameter, until the cell access of the user equipment succeeds or a quantity of random access failures reaches the random access failure threshold.

Specifically, the method provided in this embodiment of the present disclosure may be applied to a scenario of cell congestion in a wireless communications system, to solve a problem of low service access performance during cell congestion. The different service classes may include a low-priority service and a high-priority service that are differentiated according to priorities, and the high-priority service may be, for example, an emergency call, voice over IP (VoIP), high-priority signaling, or a high-priority video service. In the at least two sets of service access parameters separately corresponding to the different service classes, at least one corresponding set of service access parameters is set for each class of service. Based on an operation and market policy, the service access parameters separately corresponding to the different service classes are not completely the same as each other.

The service access parameters provided in this embodiment of the present disclosure are set on a per-service basis, and for the high-priority service, access performance of the high-priority service can be ensured by setting a corresponding service access parameter, which resolves a problem in the prior art that the access performance of the high-priority service cannot be ensured because cell access parameters are not differentiated for service classes.

Optionally, after the performing cell access according to the first service access parameter, until the quantity of random access failures of the user equipment reaches the random access failure threshold, if random access of the user equipment fails, the user equipment may perform cell reselection from the first cell to the neighboring cell of the first cell, so as to improve the service access performance of the user equipment.

Embodiment 29

Figure 30:
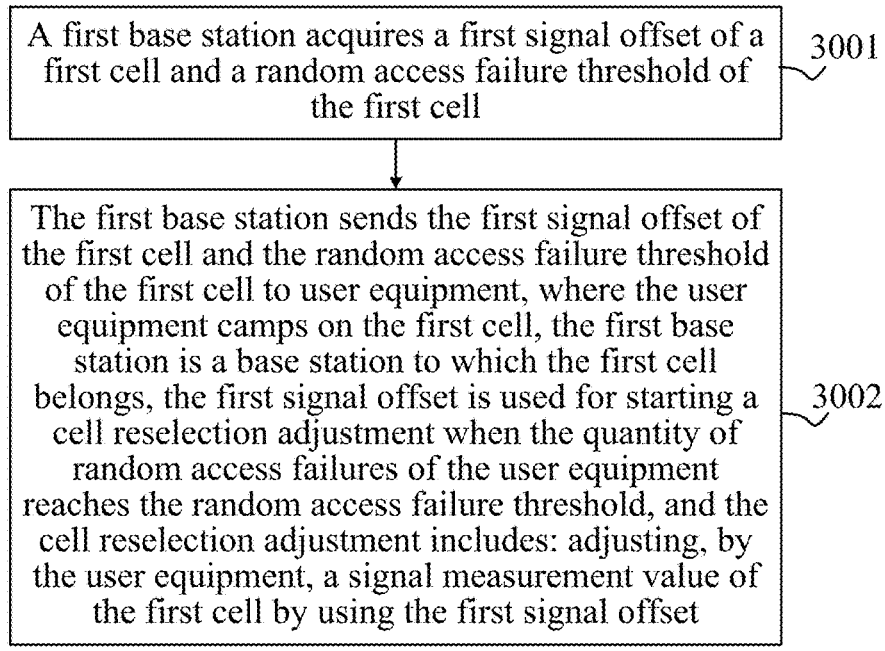
FIG. 30 is another flowchart of a cell access method according to an embodiment of the present disclosure.

FIG. 30 is another flowchart of a cell access method according to an embodiment of the present disclosure. As shown in FIG. 30, the method includes:

3001: A first base station acquires a first signal offset of a first cell and a random access failure threshold of the first cell.

3002: The first base station sends the first signal offset of the first cell and the random access failure threshold of the first cell to user equipment, where the user equipment camps on the first cell, the first base station is a base station to which the first cell belongs, the first signal offset is used for starting a cell reselection adjustment when a quantity of random access failures of the user equipment reaches the random access failure threshold, and the cell reselection adjustment includes: adjusting, by the user equipment, a signal measurement value of the first cell by using the first signal offset.

Specifically, the method provided in this embodiment of the present disclosure may be applied to a cell access scenario in a wireless communications system, and the wireless communications system may include a base station and user equipment, and the user equipment may be, for example, a smart phone or a tablet computer. Optionally, an implementation manner of acquiring, by the first base station, the first signal offset and the random access failure threshold of the first cell may be acquired by the first base station from a system configuration, may be manually configured based on network planning and/or a system operation status, or may be acquired from another base station. Further, base stations in the wireless communications system may transmit, by using an existing communications interface, a random access failure threshold provided in any embodiment of the present disclosure and a signal offset used in the cell reselection adjustment.

According to the cell access method provided in this embodiment of the present disclosure, a first signal offset and a random access failure threshold of a first cell are sent to user equipment; if the quantity of random access failures occurring when the user equipment attempts to perform random access to the current camping cell reaches the random access failure threshold, a cell reselection adjustment is started; and during cell reselection, a signal measurement value of the current camping cell is adjusted by using the first signal offset, so as to help the user equipment to reselect a neighboring cell of the current camping cell in time, and resolve a problem in the prior art that service interruption is caused because the user equipment fails to reselect another cell in time when cell access fails.

Based on the foregoing embodiment, when the user equipment camps on the first cell, the method may further include: sending, by the first base station, a second signal offset of a second cell to the user equipment, where the second cell is a neighboring cell of the first cell, and the second signal offset is used for: when the user equipment starts the cell reselection adjustment, further adjusting a signal measurement value of the second cell by using the second signal offset. Further, an improved solution of this embodiment may be that: when the user equipment camps on the first cell, the user equipment receives the second signal offset of the second cell sent by the first base station, and particularly, the cell reselection adjustment is improved to be: skipping, by the user equipment, adjusting the signal measurement value of the first cell by using the first signal offset, and adjusting, by the user equipment, the signal measurement value of the second cell by using the second signal offset. When the user equipment performs reselection, the first cell is considered as a blocked cell, and is not used as a reselection target. This helps the user equipment to reselect the second cell in time, prevents the user equipment from still reselecting the first cell, avoids service interruption, and improves user experience.

Based on the foregoing embodiment, when the user equipment camps on the first cell, the method may further include:

sending, by the first base station, a third signal offset of the first cell to the user equipment, where the third signal offset is used for: when the user equipment starts the cell reselection adjustment and camps on the second cell, further adjusting the signal measurement value of the first cell by using the third signal offset of the first cell, where the second cell is a neighboring cell of the first cell.

Optionally, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

It should be noted that, Embodiment 29 is a cell access method on a base station side, and may be used cooperatively with Embodiment 28. For content that is not introduced in detail herein, refer to the content in the embodiment, including beneficial effects and specific implementation manners. For example, for a method on a base station side for sending a fourth signal offset of the first cell, a fifth signal offset and a sixth signal offset of the second cell, and a camping cell change quantity threshold, refer to the content in Embodiment 28, which is not described herein again.

Embodiment 30

Figure 31:
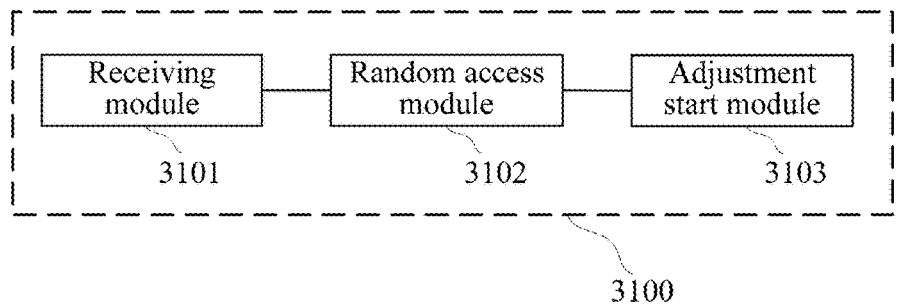
FIG. 31 is a schematic structural diagram of user equipment according to an embodiment of the present disclosure.

FIG. 31 is a schematic structural diagram of user equipment according to an embodiment of the present disclosure. As shown in FIG. 31, the user equipment 3100 provided in this embodiment of the present disclosure includes: a receiving module 3101, a random access module 3102, and an adjustment start module 3103, where the receiving module 3101 is configured to: when the user equipment camps on a first cell, receive a first signal offset of the first cell and a random access failure threshold of the first cell that are sent by a first base station, and transmit the first signal offset and the random access failure threshold to the adjustment start module 3103, where the first base station is a base station to which the first cell belongs;

the random access module 3102 is configured to attempt to perform random access to the first cell, count a quantity of random access failures, and transmit the quantity of random access failures to the adjustment start module 3103; and the adjustment start module 3103 is configured to receive the quantity of random access failures from the random access module 3102, and if the quantity of random access failures reaches the random access failure threshold, start a cell reselection adjustment, where the cell reselection adjustment includes: adjusting a signal measurement value of the first cell by using the first signal offset.

The user equipment 3100 provided in this embodiment of the present disclosure can be configured to perform the technical solution of the method embodiment shown in FIG. 29, of which the implementation principles and technical effects are similar, and details are not described herein again.

Optionally, the receiving module 3101 is further configured to: when the user equipment camps on the first cell, receive a second signal offset of a second cell sent by the first base station, where the second cell is a neighboring cell of the first cell, and the cell reselection adjustment further includes: adjusting a signal measurement value of the second cell by using the second signal offset.

Figure 32:
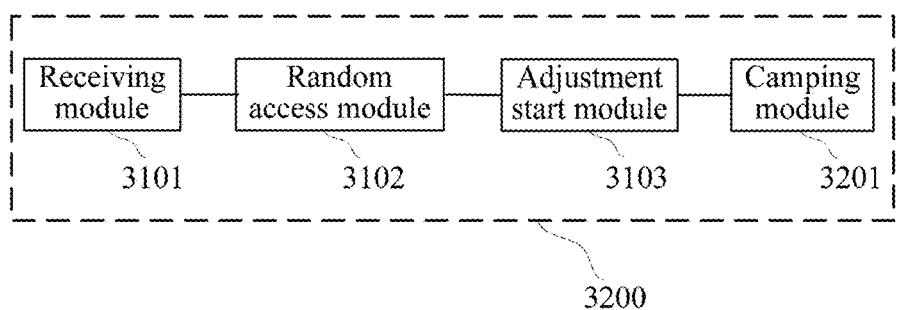
FIG. 32 is another schematic structural diagram of user equipment according to an embodiment of the present disclosure.

FIG. 32 is another schematic structural diagram of user equipment according to an embodiment of the present disclosure. This embodiment of the present disclosure is implemented based on the structure shown in FIG. 31. As shown in FIG. 32, the user equipment 3200 provided in this embodiment of the present disclosure also includes the receiving module 3101, the random access module 3102, and the adjustment start module 3103. Further, the user equipment 3200 further includes a camping module 3201, where the camping module 3201 is configured to: after the user equipment performs cell reselection, select the second cell to camp on, where the second cell is a neighboring cell of the first cell, and the cell reselection adjustment further includes: when the user equipment camps on the second cell and performs cell reselection, adjusting the signal measurement value of the first cell by using the first signal offset.

Optionally, the receiving module 3101 is further configured to: when the user equipment camps on the first cell, further receive a third signal offset of the first cell sent by the first base station; and the camping module 3201 is configured to: after the user equipment performs cell reselection, select the second cell to camp on, where the second cell is a neighboring cell of the first cell, and the cell reselection adjustment further includes: when the user equipment camps on the second cell and performs cell reselection, adjusting the signal measurement value of the first cell by using the third signal offset of the first cell.

Optionally, the camping module 3201 is configured to: after the user equipment performs cell reselection, select the second cell to camp on, where the second cell is a neighboring cell of the first cell; and the receiving module 3101 is further configured to receive a fourth signal offset of the first cell sent by a second base station, where the second base station is a base station to which the second cell belongs, and the cell reselection adjustment further includes: when the user equipment camps on the second cell and performs cell reselection, adjusting the signal measurement value of the first cell by using the fourth signal offset.

Optionally, the camping module 3201 is configured to: after the user equipment performs cell reselection, select the second cell to camp on, where the second cell is a neighboring cell of the first cell; and the receiving module 3101 is further configured to receive a fifth signal offset of the second cell sent by the second base station, where the second base station is a base station to which the second cell belongs, and the cell reselection adjustment further includes: when the user equipment camps on the second cell and performs cell reselection, adjusting the signal measurement value of the second cell by using the fifth signal offset.

Figure 33:
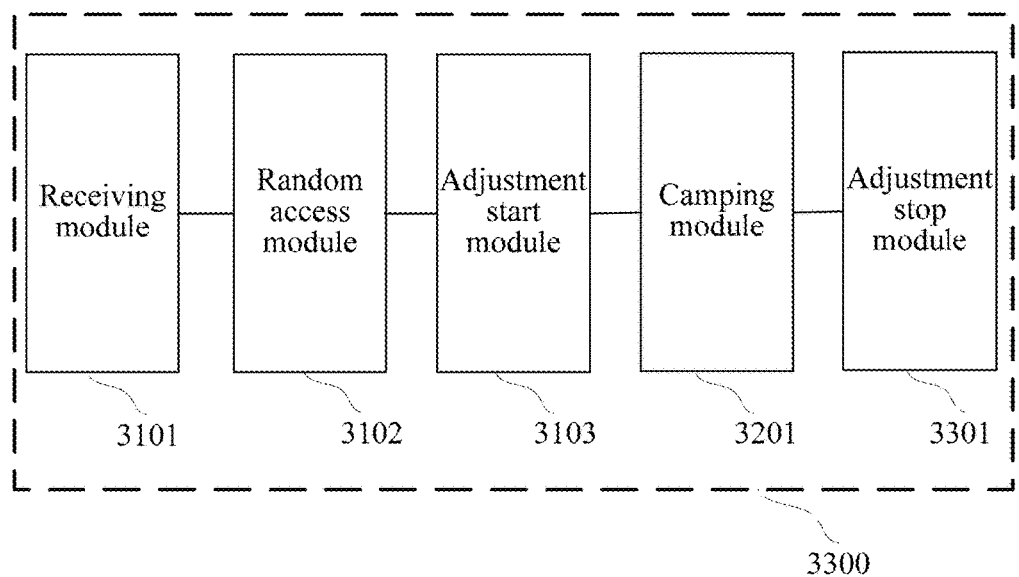
FIG. 33 is still another schematic structural diagram of user equipment according to an embodiment of the present disclosure.

FIG. 33 is still another schematic structural diagram of user equipment according to an embodiment of the present disclosure. This embodiment of the present disclosure is implemented based on the structure shown in FIG. 32. As shown in FIG. 33, the user equipment 3300 provided in this embodiment of the present disclosure also includes the receiving module 3101, the random access module 3102, the adjustment start module 3103, and the camping module 3201. Optionally, the user equipment 3300 further includes an adjustment stop module 3301, where the stopping adjustment module 3301 is configured to: after the user equipment starts the cell reselection adjustment, count a quantity of changes of a camping cell, where the quantity of changes of a camping cell indicates quantities of changes of a current camping cell and a previous camping cell after the user equipment performs cell reselection; and if the quantity of changes of a camping cell reaches a camping cell change quantity threshold, stop the cell reselection adjustment; or the stopping adjustment module 3301 is configured to: if no cell meeting a service condition is found in a current camping cell or a neighboring cell of the current camping cell, stop the cell reselection adjustment.

Optionally, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

Embodiment 31

Figure 34:
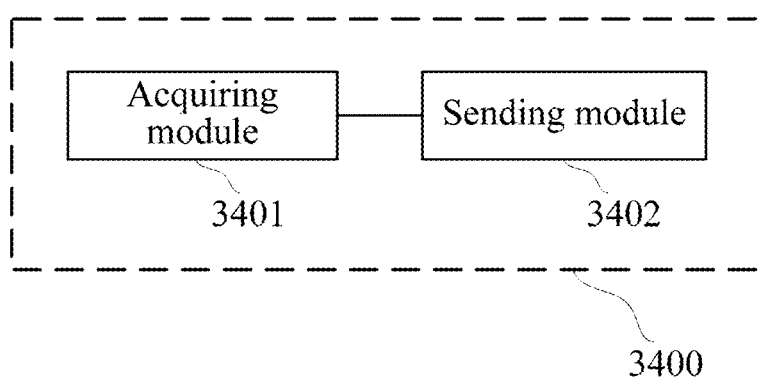
FIG. 34 is a schematic structural diagram of a base station according to an embodiment of the present disclosure.

FIG. 34 is a schematic structural diagram of a base station according to an embodiment of the present disclosure. As shown in FIG. 34, the base station 3400 provided in this embodiment of the present disclosure includes: an acquiring module 3401 and a sending module 3402, where the acquiring module 3401 is configured to acquire a first signal offset of a first cell and a random access failure threshold of the first cell; and the sending module 3402 is configured to: when user equipment camps on the first cell, send the first signal offset of the first cell and the random access failure threshold of the first cell to the user equipment, where the base station is a base station to which the first cell belongs, the first signal offset is used for starting a cell reselection adjustment when a quantity of random access failures of the user equipment reaches the random access failure threshold, and the cell reselection adjustment includes: adjusting, by the user equipment, a signal measurement value of the first cell by using the first signal offset.

The base station 3400 provided in this embodiment of the present disclosure can be configured to perform the technical solution of the method embodiment shown in FIG. 30, of which the implementation principles and technical effects are similar, and details are not described herein again.

Optionally, the sending module 3402 is further configured to: when the user equipment camps on the first cell, send a second signal offset of a second cell to the user equipment, where the second cell is a neighboring cell of the first cell, and the second signal offset is used for further adjusting a signal measurement value of the second cell when the user equipment starts the cell reselection adjustment.

Optionally, the sending module 3402 is further configured to: when the user equipment camps on the first cell, send a third signal offset of the first cell to the user equipment, where the third signal offset is used for: when the user equipment starts the cell reselection adjustment and camps on the second cell, further adjusting the signal measurement value of the first cell by using the third signal offset of the first cell, and the second cell is a neighboring cell of the first cell.

Based on the foregoing embodiment, the quantity of random access failures includes at least one of the following: a quantity of random access attempts, a quantity of preamble sending times, and a quantity of timer timeouts, where a timer starts when the user equipment attempts to perform random access to the first cell; and correspondingly, the random access failure threshold includes at least one of the following: random access attempt quantity threshold, a preamble sending times threshold, and a timer timeout quantity threshold.

Embodiment 32

Figure 35:
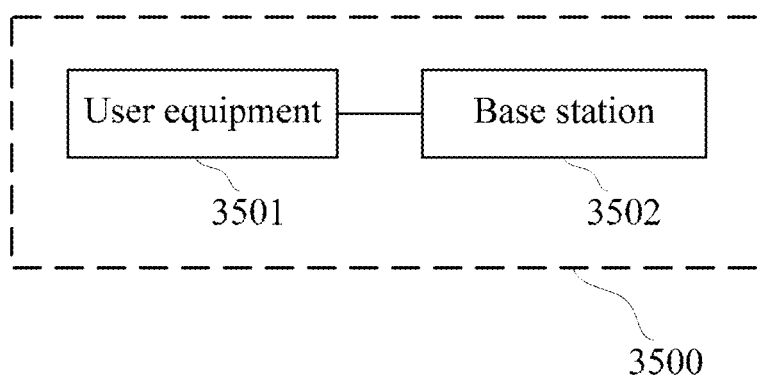
FIG. 35 is a schematic structural diagram of a cell access system according to an embodiment of the present disclosure.

FIG. 35 is a schematic structural diagram of a cell access system according to an embodiment of the present disclosure. As shown in FIG. 35, the cell access system 3500 provided in this embodiment of the present disclosure includes: user equipment 3501; or a base station 3502. The user equipment 3501 may use the structure of the user equipment provided in Embodiment 30, and can perform the technical solution of the method embodiment shown in FIG. 29 of the present disclosure, of which the implementation principles and technical effects are similar, and details are not described herein again. The base station 3502 may use the structure of the base station provided in Embodiment 31, and can perform the technical solution of the method embodiment shown in FIG. 30 of the present disclosure, of which the implementation principles and technical effects are similar, and details are not described herein again.

Embodiment 33

Figure 36:
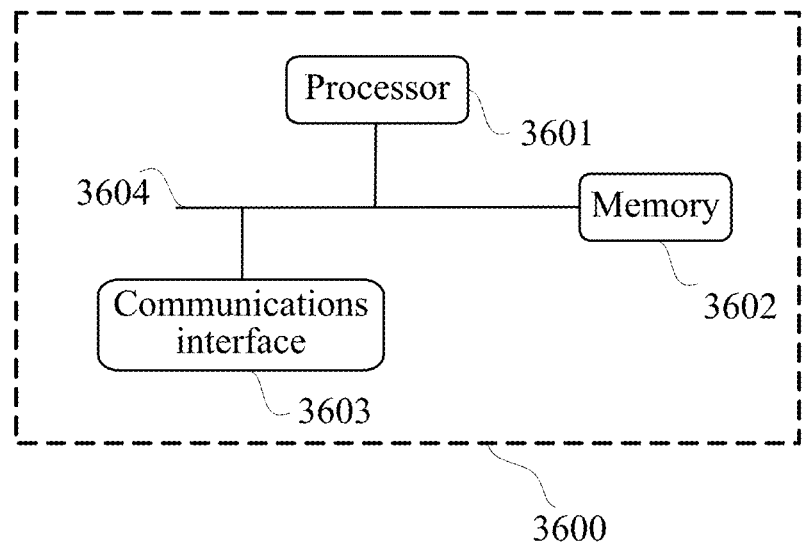
FIG. 36 is yet another schematic structural diagram of user equipment according to an embodiment of the present disclosure.

FIG. 36 is yet another schematic structural diagram of user equipment according to an embodiment of the present disclosure. As shown in FIG. 36, the user equipment 3600 provided in this embodiment of the present disclosure includes: a processor 3601, a memory 3602, and a communications interface 3603, and further includes a communications bus 3604. The processor 3601, the memory 3602, and the communications interface 3603 are connected to each other by using the communications bus 3604.

The processor 3601 may be a general purpose processor, including a central processing unit (CPU), a network processor (NP), and the like; and may also be a digital signal processor (DSP), an application-specific integrated circuit (ASIC), a field programmable gate array (FPGA) or another programmable logical device, or a discrete hardware component.

The memory 3602 is configured to store a program. Specifically, the program may include program code, and the program code includes a computer operation instruction. The memory 3602 may include a high-speed random access memory (RAM), and may further include a non-volatile memory, for example, at least one disk memory.

The communications interface 3603 is configured for communication between the user equipment 3600 and another device, and a packet may be received or sent by using the communications interface.

When the user equipment 3600 runs, the processor 3601 communicates with the memory 3602, and the processor 3601 executes the program stored in the memory 3602, and performs the cell access method provided in Embodiment 28. For related content, refer to the introductions in Embodiment 28, which is not described herein again.

Embodiment 34

Figure 37:
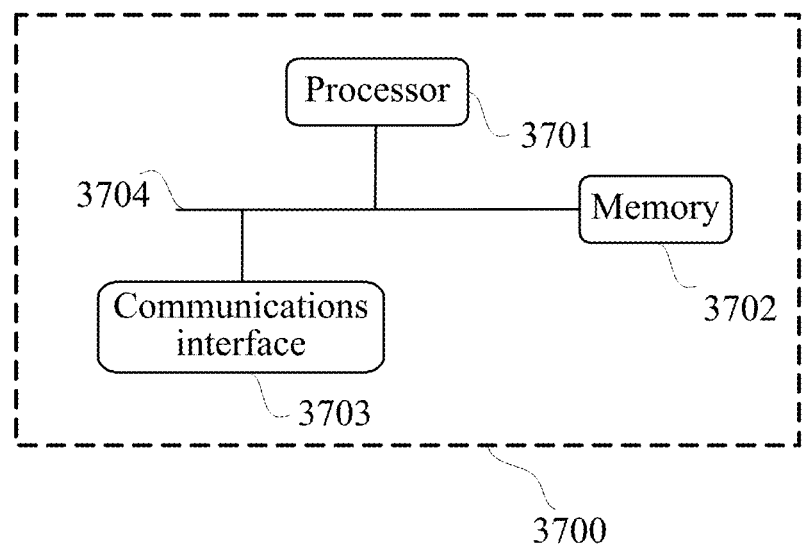
FIG. 37 is another schematic structural diagram of a base station according to an embodiment of the present disclosure.

FIG. 37 is another schematic structural diagram of a base station according to an embodiment of the present disclosure. As shown in FIG. 37, the base station 3700 provided in this embodiment of the present disclosure includes: a processor 3701, a memory 3702, and a communications interface 3703, and further includes a communications bus 3704. The processor 3701, the memory 3702, and the communications interface 3703 are connected to each other by using the communications bus 3704.

The processor 3701 may be a general purpose processor, including a CPU, a network processor, and the like; and may also be a digital signal processor (DSP), an application-specific integrated circuit (ASIC), a field programmable gate array (FPGA) or another programmable logical device, or a discrete hardware component.

The memory 3702 is configured to store a program. Specifically, the program may include program code, and the program code includes a computer operation instruction. The memory 3702 may include a high-speed RAM, and may further include a non-volatile memory, for example, at least one disk memory.

The communications interface 3703 is configured for communication between the base station 3700 and another device, and a packet may be received or sent by using the communications interface.

When the base station 3700 runs, the processor 3701 communicates with the memory 3702, and the processor 3701 executes the program stored in the memory 3702, and performs the cell access method provided in Embodiment 30. For related content, reference may be made to the introductions in Embodiment 29 and Embodiment 28, which is not described herein again.

It should be noted that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects. In the foregoing embodiments, the description of each embodiment has respective focuses. For a part that is not described in detail in an embodiment, reference may be made to related descriptions in other embodiments. In addition, the relational terms such as first and second are used only to differentiate an entity from another entity, and do not require or imply such an actual relationship or sequence between these entities.

Finally, it should be noted that, differentiation of the foregoing embodiments is merely used for describing the technical solutions of the present disclosure, and the technical solutions provided in the embodiments may be referenced to each other or combined with each other. Although the present disclosure is described in detail with reference to the foregoing embodiments, a person of ordinary skill in the art should understand that they may still make modifications to the technical solutions recorded in the foregoing embodiments or make equivalent replacements to some or all technical features thereof, as long as such modifications or replacements do not cause the essence of corresponding technical solutions to depart from the scope of the technical solutions of the embodiments of the present disclosure.

What is claimed is:

1. A cell access method comprising:
when a user equipment camps on a first cell, receiving, by the user equipment, a first signal offset of the first cell and a random access failure threshold of the first cell;
attempting, by the user equipment, to perform random access to the first cell, and counting a quantity of random access failures;
if the quantity of random access failures reaches the random access failure threshold, performing cell reselection, by the user equipment, by using the first signal offset for the first cell; and
if a second cell is selected to camp on in the cell reselection, performing cell reselection, by the user equipment, by using the first signal offset for the first cell when camping on the second cell.

2. The method according to claim 1, further comprising:
if no cell meets a service condition in cell reselection, performing cell reselection, by the user equipment, without using the first signal offset.

3. The method according to claim 1, wherein the quantity of random access failures is a quantity of timer timeouts, wherein a timer starts when the user equipment attempts to perform random access to the first cell, and the random access failure threshold is a timer timeout quantity threshold.

4. The method according to claim 1, wherein the quantity of random access failures is a quantity of random access attempts, and the random access failure threshold is a random access attempt quantity threshold.

5. The method according to claim 1, wherein the quantity of random access failures is a quantity of preamble sending times, and the random access failure threshold is a preamble sending times threshold.

6. The method according to claim 1, further comprising:
when the user equipment camps on the first cell, receiving, by the user equipment, a second signal offset of a second cell, wherein the second cell is a neighboring cell of the first cell; and
if the quantity of random access failures reaches the random access failure threshold, performing cell reselection, by the user equipment, by using the second signal offset for the second cell.

7. The method according to claim 6, further comprising:
if the second cell is selected to camp on in the cell reselection, performing cell reselection, by the user equipment, by using a third signal offset for the third cell when camping on the second cell;
wherein the third signal offset is received from the first cell when camping on the first cell.

8. A user equipment comprising:
a memory storing instructions; and
a processor coupled to the memory to execute the instructions to:
receive a first signal offset of a first cell and a random access failure threshold of the first cell when the user equipment camps on the first cell;
attempt to perform random access to the first cell, and count a quantity of random access failures;

perform cell reselection by using the first signal offset for the first cell if the quantity of random access failures reaches the random access failure threshold; and perform cell reselection by using the first signal offset for the first cell when camping on a second cell if the second cell is selected to camp on in the cell reselection when camping on the first cell.

9. The user equipment according to claim 8, wherein the processor is configured to execute the instructions to:

perform cell reselection without using the first signal offset for the first cell if no cell meets a service condition in the cell reselection.

10. The user equipment according to claim 8, wherein the quantity of random access failures is a quantity of timer timeouts, wherein a timer starts when the user equipment attempts to perform random access to the first cell, and the random access failure threshold is a timer timeout quantity threshold.

11. The user equipment according to claim 8, wherein the quantity of random access failures is a quantity of random access attempts, and the random access failure threshold is a random access attempt quantity threshold.

12. The user equipment according to claim 8, wherein the quantity of random access failures is a quantity of preamble sending times, and the random access failure threshold is a preamble sending times threshold.

13. The user equipment according to claim 8, wherein the processor is configured to execute the instructions to:

receive a second signal offset of a second cell when camping on the first cell, and perform cell reselection by using the second signal offset for the second cell if the quantity of random access failures reaches the random access failure threshold.

14. The user equipment according to claim 13, wherein the processor is configured to execute the instructions to:

perform cell reselection by using a third signal offset for the first cell when camping on the second cell if the second cell is selected to camp on in the cell reselection;

wherein the third signal offset is received from the first cell when camping on the first cell.

15. A communication system comprising:

a base station, configured to send a first signal offset of a first cell and a random access failure threshold of the first cell to a user equipment;

the user equipment is configured to:

receive the first signal offset of the first cell and a random access failure threshold of the first cell when the user equipment camps on the first cell;

attempt to perform random access to the first cell, and count a quantity of random access failures;

perform cell reselection by using the first signal offset for the first cell if the quantity of random access failures reaches the random access failure threshold; and perform cell reselection by using the first signal offset for the first cell when camping on a second cell if the second cell is selected to camp on in the cell reselection when camping on the first cell.

16. The communication system according to claim 15, wherein the user equipment is further configured to perform cell reselection without using the first signal offset for the first cell if no cell meets a service condition in the cell reselection.

17. The communication system according to claim 15, wherein the quantity of random access failures is a quantity of timer timeouts, wherein a timer starts when the user equipment attempts to perform random access to the first cell, and the random access failure threshold is a timer timeout quantity threshold.

18. The communication system according to claim 15, wherein the quantity of random access failures is a quantity of random access attempts, and the random access failure threshold is a random access attempt quantity threshold.

19. The communication system according to claim 15, wherein the quantity of random access failures is a quantity of preamble sending times, and the random access failure threshold is a preamble sending times threshold.

20. The communication system according to claim 15, wherein the user equipment is configured to:

receive a second signal offset of a second cell when camping on the first cell; and perform cell reselection by using the second signal offset for the second cell if the quantity of random access failures reaches the random access failure threshold.

21. An electronic hardware set in a user equipment, the electronic hardware comprising:

a processor, and a memory coupled with the processor;

wherein the memory is configured to store instructions which, when executed by the processor, cause the user equipment to:

receive the first signal offset of the first cell and a random access failure threshold of the first cell when the user equipment camps on the first cell;

attempt to perform random access to the first cell, and count a quantity of random access failures;

perform cell reselection by using the first signal offset for the first cell if the quantity of random access failures reaches the random access failure threshold; and perform cell reselection by using the first signal offset for the first cell when camping on a second cell if the second cell is selected to camp on in the cell reselection when camping on the first cell.

22. The electronic hardware according to claim 21 wherein:

the quantity of random access failures is a quantity of random access attempts, and the random access failure threshold is a random access attempt quantity threshold.

23. The electronic hardware according to claim 21, wherein the instructions cause the user equipment to:

perform cell reselection without using the first signal offset for the first cell if no cell meets a service condition in the cell reselection.

24. The electronic hardware according to claim 21, wherein the instructions cause the user equipment to:

receive a second signal offset of a second cell when camping on the first cell; and perform cell reselection by using the second signal offset for the second cell if the quantity of random access failures reaches the random access failure threshold.

25. The electronic hardware according to claim 21, wherein the instructions cause the user equipment to:
perform cell reselection by using a third signal offset for the first cell when camping on the second cell if the second cell is selected to camp on in the cell reselection;
wherein the third signal offset is received from the first cell when camping on the first cell.

\* \* \* \* \*